United States Patent
Onose et al.

(10) Patent No.: US 12,200,637 B2
(45) Date of Patent: Jan. 14, 2025

(54) COMMUNICATION DEVICE, COMMUNICATION CONTROL DEVICE, AND COMMUNICATION METHOD

(71) Applicant: Sony Group Corporation, Tokyo (JP)

(72) Inventors: Keita Onose, Tokyo (JP); Ryo Sawai, Tokyo (JP); Ryota Kimura, Tokyo (JP); Hiroto Kuriki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 339 days.

(21) Appl. No.: 17/785,925

(22) PCT Filed: Dec. 15, 2020

(86) PCT No.: PCT/JP2020/046791
§ 371 (c)(1),
(2) Date: Jun. 16, 2022

(87) PCT Pub. No.: WO2021/131913
PCT Pub. Date: Jul. 1, 2021

(65) Prior Publication Data
US 2023/0022683 A1    Jan. 26, 2023

(30) Foreign Application Priority Data
Dec. 26, 2019   (JP) ................................. 2019-237085

(51) Int. Cl.
*H04W 16/14* (2009.01)
*H04B 7/06* (2006.01)
(Continued)

(52) U.S. Cl.
CPC ........ *H04W 52/367* (2013.01); *H04B 7/0617* (2013.01); *H04W 16/14* (2013.01); *H04W 52/243* (2013.01)

(58) Field of Classification Search
CPC .. H04B 17/345; H04B 7/0617; H04B 7/0695; H04W 16/28; H04W 52/243; H04W 52/42; H04W 52/367; H04W 16/14
See application file for complete search history.

(56) References Cited

U.S. PATENT DOCUMENTS

2009/0247171 A1* 10/2009 Suga .................... H04W 72/046
455/447
2017/0265148 A1* 9/2017 Balasubramanian ........................
H04W 52/248
(Continued)

FOREIGN PATENT DOCUMENTS

WO      2019/026375 A1    2/2019

OTHER PUBLICATIONS

International Search Report and Written Opinion mailed on Mar. 16, 2021, received for PCT Application PCT/JP2020/046791, filed on Dec. 15, 2020, 13 pages including English Translation.
(Continued)

*Primary Examiner* — Syed Ali
(74) *Attorney, Agent, or Firm* — XSENSUS LLP

(57) ABSTRACT

A communication device according to one aspect of the present disclosure includes an acquisition unit, a calculation unit, and a radio wave communication unit. The acquisition unit acquires a position of a reference point provided in a region related to a first wireless system and a limit value of an interference quantity at the reference point. The calculation unit calculates, on the basis of at least the position and the limit value, allowable power by which an interference quantity of a radio wave transmitted by beamforming at the reference point is equal to or less than the limit value. The radio wave communication unit that transmits a radio wave having a frequency within a second frequency band partially or entirely overlapping with a first frequency band allocated (Continued)

to the first wireless system by beamforming with power equal to or less than the allowable power.

10 Claims, 17 Drawing Sheets

(51) Int. Cl.
*H04W 52/24* (2009.01)
*H04W 52/36* (2009.01)

(56) References Cited

U.S. PATENT DOCUMENTS

| | | | |
|---|---|---|---|
| 2017/0265189 A1 | 9/2017 | Stephenne et al. | |
| 2017/0359785 A1 | 12/2017 | Sawai | |
| 2018/0220257 A1* | 8/2018 | Bhattad | H04W 4/70 |
| 2019/0021085 A1 | 1/2019 | Mochizuki | |
| 2019/0090141 A1* | 3/2019 | Fujii | H04W 16/14 |
| 2019/0379441 A1* | 12/2019 | Priyanto | H04L 5/0048 |
| 2020/0029223 A1* | 1/2020 | Liu | H04L 27/2627 |
| 2020/0036566 A1* | 1/2020 | Moroga | H04L 5/0053 |
| 2020/0344031 A1* | 10/2020 | Shao | H04W 72/56 |
| 2020/0413325 A1* | 12/2020 | Meredith | H04W 48/16 |
| 2021/0099847 A1* | 4/2021 | Uchiyama | H04W 4/46 |
| 2022/0263614 A1* | 8/2022 | Liu | H04W 16/14 |
| 2022/0394491 A1* | 12/2022 | Khawer | H04W 12/06 |
| 2022/0417761 A1* | 12/2022 | Khawer | H04W 16/14 |

OTHER PUBLICATIONS

3GPP, "Evolved Universal Terrestrial Radio Access (E-UTRA); Base Station (BS) radio transmission and reception (Release 16)", 3GPP TS 36.104 V16.7.0, Sep. 2020, pp. 1-290.

3GPP, "NR; Base Station (BS) radio transmission and reception (Release 16)", 3GPP TS 38.104 V16.5.0, Sep. 2020, pp. 1-279.

CBRS Alliance "CBRS Coexistence Technical Specifications", CBRSA-TS-2001 V3.0.0, Available Online at: https://www.cbrsalliance.org/wp-content/uploads/2018/06/CBRSA-TS-2001-V1.0.0.pdf, Feb. 18, 2020, pp. 1-30.

"Technical and operational requirements for the operation of white space devices under geo-location approach", CEPT ECC, ECC Report 186, Jan. 2013, pp. 1-181.

ETSI, "White Space Devices (WSD); Wireless Access Systems operating in the 470 MHz to 790 MHz TV broadcast band; Harmonized EN covering the essential requirements of article 3.2 of the R&TTE Directive", ETSI EN 301 598 V1.1.1, Apr. 2014, pp. 1-72.

"Part 96—citizens Broadband Radio Service", Electronic Code of Federal Regulations, Title 47, Chapter 1, Subchapter D, Available Online at: https://www.ecfr.gov/cgibin/retrieveECFRgp=&SID=2dd346ae3b51f2866ab6fb907e755526&mc=true&r=PARTn=pt47.5.96, Jul. 28, 2021, pp. 1-31.

Sawai et al., "Coexistence mechanism and its algorithm", Wireless Coexistence, IEEE 802.19-10/0145r1, Nov. 2010, pp. 1-33.

The National Archives, "The Wireless Telegraphy (White Space Devices) (Exemption) Regulations 2015", Electronic Communications, Statutory Instruments, 2015 No. 2066, Available Online at: http://www.legislation.gov.uk/uksi/2015/2066/contents/made, Jul. 18, 2017, pp. 1-9.

"White Space Database Provider (WSDB) Contract", Available Online at: https://www.ofcom.org.uk/_data/assets/pdf_file/0026/84077/white_space_database_contract_for_operational_use_of_wsds.pdf, 2015, pp. 1-125.

"Requirements for Commercial Operation in the U.S. 3550-3700 MHz Citizens Broadband Radio Service Band", Wireless Innovation Forum, WINNF-TS-0112 Version V1.9.1, Mar. 11, 2020, pp. 1-76.

"Signaling Protocols and Procedures for Citizens Broadband Radio Service (CBRS): WInnForum Recognized CBRS Grouping Information", Wireless Innovation Forum, WINNF-SSC-0010 Version 1.0.0, Jan. 31, 2019, pp. 1-5.

"Signaling Protocols and Procedures for Citizens Broadband Radio Service (CBRS): Spectrum Access System (SAS)—Citizens Broadband Radio Service Device (CBSD) Interface Technical Specification", Wireless Innovation Forum, WINNF-TS-0016 Version V1.2.6, Nov. 25, 2020, pp. 1-52.

"Signaling Protocols and Procedures for Citizens Broadband Radio Service (CBRS): Spectrum Access System (SAS)—SAS Interface Technical Specification", Wireless Innovation Forum, WINNF-TS-0096 Version 1.3.2, Mar. 11, 2020, pp. 1-38.

"CBRS Certified Professional Installer Accreditation Technical Specification", Wireless Innovation Forum, WINNF-TS-0247 Version V1.5.0, Oct. 27, 2020, pp. 1-15.

Sawada et al., "Development of path loss and throughput estimation models using IEEE 802.11af Prototypes", IEEE 802.11af, The Institute of Electronics Information and Communication Engineers, IEICE Technical Report, May 2015, 9 pages.

* cited by examiner

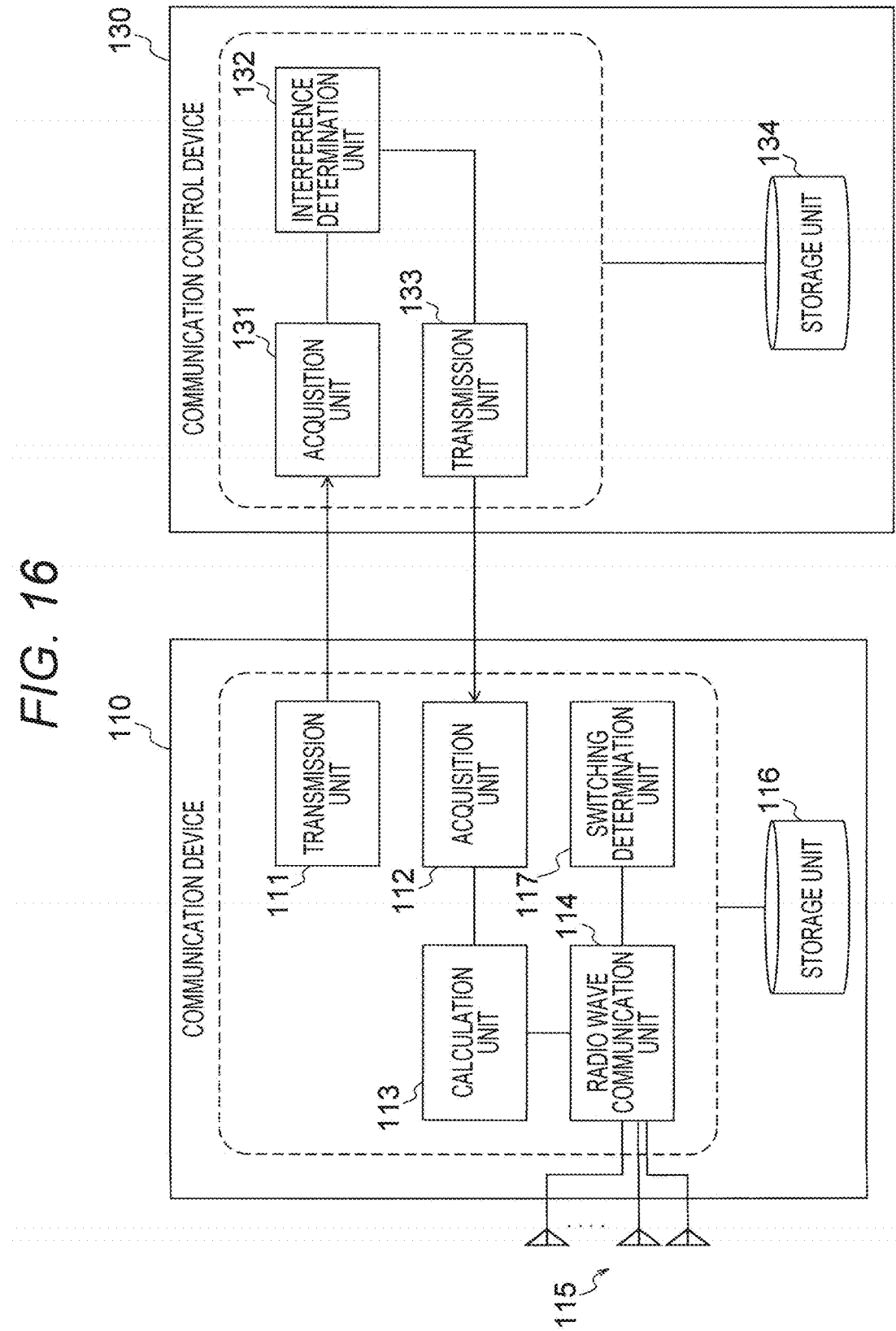

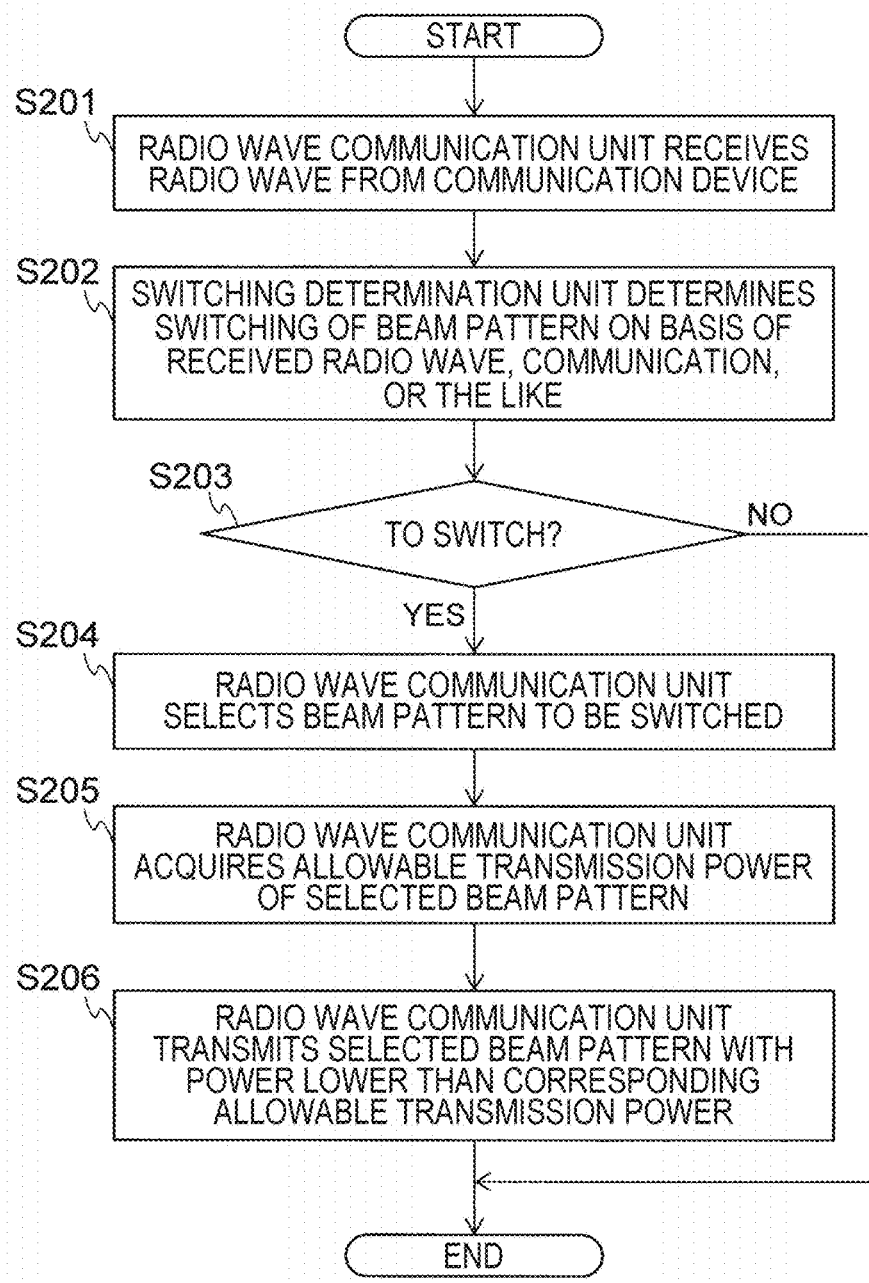

COMMUNICATION DEVICE, COMMUNICATION CONTROL DEVICE, AND COMMUNICATION METHOD

CROSS-REFERENCE TO RELATED APPLICATIONS

The present application is based on PCT filing PCT/JP2020/046791, filed Dec. 15, 2020, which claims priority to JP 2019-237085, filed Dec. 26, 2019, the entire contents of each are incorporated herein by reference.

TECHNICAL FIELD

The present disclosure relates to a communication device, a communication control device, and a communication method.

BACKGROUND ART

Hitherto, due to increase in a wireless environment in which various wireless systems are mixed and diversification of content provided wirelessly, a problem of exhaustion of radio resources (for example, spectrum) that can be allocated to the wireless systems has emerged. Accordingly, as a means for extracting necessary radio resources, "dynamic spectrum sharing (dynamic spectrum access (DSA))" for using an unused temporal and spatial vacancy (white space) in a frequency band allocated to a specific wireless system has rapidly attracted attention in Japan and foreign countries.

In foreign countries, spectrum allocation studies and technical development are in progress in many countries. In the United States, with the aim of opening a federal use band (3.55 to 3.70 GHz) overlapping with a frequency band that is globally 3GPP bands 42 and 43 to the public, legislation and standardization of citizens broadband radio service (CBRS) that uses a spectrum sharing technology are accelerating. In recent years, there have been movements in Japan to introduce such a mechanism for spectrum sharing, and "Research and Development on Advancement of Spectrum Sharing Technologies between Different Systems" have been carried out on the initiative of the Ministry of Internal Affairs and Communications since 2019. In this research and development project, it is considered to open the 2.3 GHz band, the 26 GHz band, and the like, which are listed as candidates for the target of sharing in the spectrum restructuring action plan, to the 5th generation mobile communication (5G) system, which will be introduced in the future.

CITATION LIST

Non-Patent Document

Non-Patent Document 1: WO2019/026375 A1
Non-Patent Document 2: CBRS Alliance "CBRSA-TS-2001" Feb. 1, 2018 "https://www.cbrsalliance.org/wp-content/uploads/2018/06/CBRSA-TS-2001-V1.0.0.pdf"
Non-Patent Document 3: WINNF (Wireless Innovation Forum), "WINNF-TS-0112", "https://winnf.memberclicks.net/assets/CBRS/WINNF-TS-0112.pdf"
Non-Patent Document 4: CEPT ECC, "ECC Report 186 Technical and operational requirements for the operation of white space devices under geo-location approach", January 2013, "https://www.ecodocdb.dk/download/124023a2-73ee/ECCREP186.PDF"
Non-Patent Document 5: The National Archives, "The Wireless Telegraphy (White Space Devices) (Exemption) Regulations 2015", "http://www.legislation.gov.uk/uksi/2015/2066/contents/ma de"
Non-Patent Document 6: WINNF, "WINNF-SSC-0010", "https://winnf.memberclicks.net/assets/CBRS/WINNF-SSC-0010.pdf"
Non-Patent Document 7: FCC (Federal Communications Commissions), "C.F.R. (Code of Federal Regulations) Part 96", "https://www.ecfr.gov/cgi-bin/retrieveECFR?gp=&SID=2dd346ae3b51f2866ab6fb907e755526&mc=true&r=PART&n=pt47.5.96"
Non-Patent Document 8: 3GPP (3rd Generation Partnership Project), "TS(Technical Specification)36.104", "https://portal.3gpp.org/desktopmodules/Specifications/Sp ecificationDetails.aspx?specificationId=2412"
Non-Patent Document 9: 3GPP, "TS38.104", "https://portal.3gpp.org/desktopmodules/Specifications/Sp ecificationDetails.aspx?specificationId=3202"
Non-Patent Document 10: ETSI (European Telecommunications Standards Institute), "EN 301 598", "https://www.etsi.org/deliver/etsi_en/301500_301599/301598/01.01.01_60/en_301598v010101p.pdf"
Non-Patent Document 11: WINNF, "WINNF-TS-0016", "https://winnf.memberclicks.net/assets/CBRS/WINNF-TS-0016.pdf"
Non-Patent Document 12: WINNF, "WINNF-TS-0247", "https://winnf.memberclicks.net/assets/CBRS/WINNF-TS-0247.pdf"
Non-Patent Document 13: White Space Database Provider (WSDB) Contract, available at "https://www.ofcom.oro.uk/_data/assets/pdf file/0026/84077/white_space_database_contract_for_operatioper_use_of_wsds.pdf"
Non-Patent Document 14: WINNF, "WINNF-TS-0096", "https://winnf.memberclicks.net/assets/CBRS/WINNF-TS-0096.pdf"

SUMMARY OF THE INVENTION

Problems to be Solved by the Invention

As described above, in the spectrum sharing in Japan, it is considered to open an existing wireless system to the 5G system. On the other hand, legal requirements and standards related to free channel calculation, which are being introduced in countries other than Japan, do not take into account characteristics of multi-antenna technology such as beamforming assumed to be used in 5G.

In Non-Patent Document [6], it is required to detect a potential interferer on the basis of the position of a reference point serving as a reference of interference calculation or a separation distance from a protection zone end, and to suppress a power value of aggregate interference from the detected interferer to a predetermined threshold value or less. It is obvious that this requirement is on the premise that the wireless device uses an omnidirectional antenna, and for example, it is also prohibited that the wireless device having a beamforming function transmits a high output beam in a direction opposite to the protection area, which impairs the convenience of beamforming.

Furthermore, when the beam pattern is changed, it is required to stop transmission of the radio wave by the potential interferer and recalculate the aggregate interference power value. Thus, when the beam is made to follow the terminal that receives the radio wave, it is necessary to temporarily stop transmission of the radio wave. This does not take full advantage of characteristics of beam switching and following technologies that can be implemented in units of milliseconds.

There are also prior art documents, such as WO2019/026375 A1, which present a suitable spectrum sharing mechanism in a case where a secondary system performs beamforming, but do not solve the problem.

Therefore, the present disclosure proposes a communication device and the like of a secondary system capable of seamlessly switching a beam pattern of beamforming without giving harmful interference to a primary system.

Solutions to Problems

A communication device according to one aspect of the present disclosure includes an acquisition unit, a calculation unit, and a radio wave communication unit. The acquisition unit acquires a position of a reference point provided in a region related to a first wireless system and a limit value (also referred to as an allowable interference level) of an interference quantity at the reference point. The calculation unit calculates, on the basis of at least the position and the limit value, allowable power by which an interference quantity of a radio wave transmitted by beamforming at the reference point is equal to or less than the limit value. The radio wave communication unit that transmits a radio wave having a frequency within a second frequency band partially or entirely overlapping with a first frequency band allocated to the first wireless system by beamforming with power equal to or less than the allowable power.

The communication device may be configured such that the calculation unit calculates the allowable power for each of a plurality of beam patterns related to the beamforming, and when any one of the plurality of beam patterns is selected, the radio wave communication unit transmits the radio wave according to a selected beam pattern with power equal to or less than allowable power corresponding to the selected beam pattern.

The communication device may be configured to further include a determination unit that determines whether to perform switching of the selected beam pattern, in which when it is determined to perform the switching, the radio wave communication unit transmits the radio wave according to a beam pattern to be newly switched with power equal to or less than allowable power corresponding to the beam pattern to be newly switched and calculated before determination of the switching.

The communication device may be configured such that the determination unit determines whether to perform the switching on the basis of a radio wave or communication from a terminal that receives the radio wave.

The communication device may be configured such that the calculation unit calculates, when a plurality of the reference points is provided in the region, the allowable power for each of the plurality of the reference points, and the radio wave communication unit transmits the radio wave by beamforming with power equal to or less than a minimum value of allowable power of each of the plurality of the reference points.

The communication device may be configured such that the calculation unit selects a reference point that satisfies a predetermined condition when a plurality of the reference points is provided in the region, and calculates the allowable power for each of selected reference points, and the radio wave communication unit transmits the radio wave by beamforming with power equal to or less than a minimum value of the allowable power for each of the selected reference points.

The communication device may be configured such that the calculation unit calculates the allowable power for a beam pattern that satisfies a predetermined condition among the plurality of beam patterns, and the radio wave communication unit transmits the radio wave according to any one of beam patterns for which the allowable power is calculated.

The communication device may be configured such that the calculation unit calculates the allowable power for a beam pattern that does not satisfy a predetermined condition among the plurality of beam patterns on the basis of allowable power of a beam pattern that satisfies the predetermined condition.

The communication device may be configured such that the calculation unit determines a transmittable beam pattern from the plurality of beam patterns on the basis of a radiation angle of a main lobe of each of the plurality of beam patterns and a direction toward the reference point, and calculates the allowable power for a transmittable beam pattern.

The communication device may be configured such that the calculation unit calculates the allowable power for a beam pattern in which a direction toward the reference point exists within a predetermined range centered on a radiation angle of the main lobe.

According to another aspect of the present disclosure, there is provided a communication control device including a determination unit and a transmission unit. The determination unit determines whether a communication device that has requested permission to transmit a radio wave having a frequency within a shared frequency band used by a first wireless system interferes with the first wireless system. The transmission unit that transmits, in a case where the communication device and the first wireless system are determined to interfere with each other, a position of a reference point provided in a region related to the first wireless system and a limit value of an interference quantity at the reference point to the communication device.

The communication control device may be configured such that when it is determined that a plurality of communication devices interferes with the first wireless system, the determination unit distributes a limit value of an interference quantity at the reference point to the plurality of communication devices, and the transmission unit transmits the distributed limit value to each of the plurality of communication devices.

According to another aspect of the present disclosure, there is provided a communication method including a step of acquiring a position of a reference point provided in a region related to a first wireless system and a limit value of an interference quantity at the reference point, a step of calculating, on the basis of at least the position and the limit value, allowable power by which an interference quantity of a radio wave transmitted by beamforming at the reference point is equal to or less than the limit value, and a step of transmitting a radio wave having a frequency within a second frequency band partially or entirely overlapping with a first frequency band allocated to the first wireless system by beamforming with power equal to or less than the allowable power.

BRIEF DESCRIPTION OF DRAWINGS

FIG. 16 is a diagram illustrating an example of an internal configuration of the communication device for switching the beam pattern.

FIG. 17 is a flowchart of processing for switching the beam pattern.

MODE FOR CARRYING OUT THE INVENTION

<<1. Assumed Representative Scenario>>
<1.1 System Model>

Figure 1:
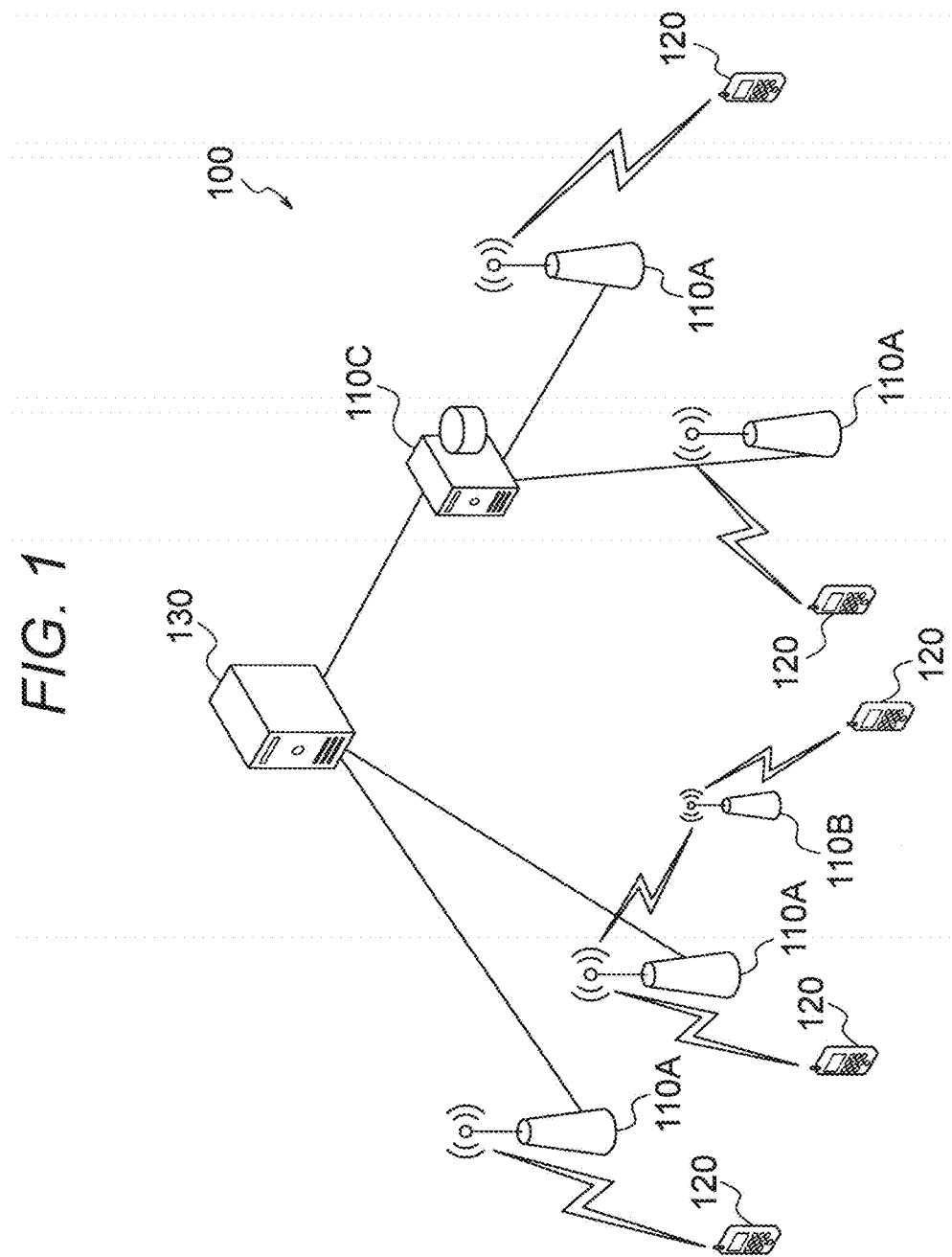
FIG. 1 is a diagram illustrating a system model in an embodiment of the present invention.

FIG. 1 illustrates a system model in an embodiment of the present invention. As illustrated in FIG. 1, this system model is represented by a communication network 100 including wireless communication, and typically includes the following entities.

Communication device 110
Terminal 120
Communication control device 130

Furthermore, this system model includes at least a primary system and a secondary system using the communication network 100. The primary system and the secondary system are configured by the communication device 110 or the communication device 110 and the terminal 120. Various communication systems can be treated as the primary system or the secondary system, but in the present embodiment, it is assumed that the primary system and the secondary system use some or all of a shared frequency band. Note that the respective frequency bands allocated to the primary system and the secondary system may partially or entirely overlap or may not overlap at all. That is, this system model will be described as a model of a wireless communication system related to dynamic spectrum sharing (dynamic spectrum access (DSA)). Note that this system model is not limited to systems related to dynamic spectrum sharing.

Typically, the communication device 110 is a wireless device that provides a wireless communication service to the terminal 120, such as a wireless base station (Base Station, Node B, eNB, gNB, or the like) or a wireless access point. That is, the communication device 110 provides a wireless communication service to enable wireless communication of the terminal 120. Furthermore, the communication device 1 may be a wireless relay device or an optical extension device called a remote radio head (RRH). In the following description, unless otherwise noted, the communication device 110 will be described as an entity constituting the secondary system.

The coverage (communication region) provided by the communication device 110 is allowed to have various sizes from a large size such as a macro cell to a small size such as a pico cell. Like a distributed antenna system (DAS), a plurality of communication devices 110 may form one cell. Furthermore, in a case where the communication device 110 has a capability of beamforming, a cell or a service area may be formed for each beam.

In the present disclosure, it is assumed that there are two different types of communication devices 110.

In the present disclosure, the communication device 110 that can access the communication control device 130 without using a wireless path that requires permission of the communication control device 130 is referred to as a "communication device 110A". Specifically, for example, the communication device 110 capable of wirelessly connecting to the Internet can be regarded as the "communication device 110A". Furthermore, for example, even in a wireless relay device that does not have a wired Internet connection function, if a wireless backhaul link using a spectrum that does not require permission of the communication control device 130 is constructed with another communication device 110A, such a wireless relay device may also be regarded as the "communication device 110A".

In the present disclosure, the communication device 110 that cannot access the communication control device 130 without a wireless path that requires permission of the communication control device 130 is referred to as a "communication device 110B". For example, a wireless relay device that needs to construct a backhaul link using a spectrum that requires permission of the communication control device 130 can be regarded as a "communication device 110B". Furthermore, for example, a device such as a smartphone having a wireless network provision function represented by tethering and using a spectrum that requires permission of the communication control device 130 in both the backhaul link and the access link may be handled as the "communication device 110B".

The communication device 110 is not necessarily fixedly installed. For example, the communication device 110 may be installed in a mobile object such as an automobile. Furthermore, the communication device 110 does not necessarily need to exist on the ground. For example, the communication device 110 may be included in an object existing in the air or space, such as an aircraft, a drone, a helicopter, a high altitude platform station (HAPS), a balloon, or a satellite. Furthermore, for example, the communication device 110 may be included in an object existing on the sea or under the sea, such as a ship or a submarine. Typically, such a mobile communication device 110 corresponds to the communication device 110B, and performs wireless communication with the communication device 110A to secure an access path to the communication control device 130. As a matter of course, even the mobile communication device 110 can be handled as the communication device 110A as long as the spectrum used in the wireless communication with the communication device 110A is not managed by the communication control device 130.

In the present disclosure, unless otherwise specified, the description "communication device 110" includes both meanings of the communication device 110A and the communication device 110B, and may be replaced with either one.

The communication device 110 can be used, operated, or managed by various operators. For example, a mobile network operator (MNO), a mobile virtual network operator (MVNO), a mobile network enabler (MNE), a mobile virtual network enabler (MVNE), a shared facility operator, a neutral host network (NHN) operator, a broadcaster, an enterprise, an educational institution (educational institutions, respective boards of education of local governments, or the like), a real estate (building, apartment, or the like) administrator, an individual, and the like can be assumed as operators related to the communication device 110. Note that the company related to the communication device 110 is not particularly limited. Further, the communication device 110A may be a shared facility used by a plurality of carriers. Furthermore, different companies may perform installation, use, and management of the facilities.

The communication device 110 operated by the company is typically connected to the Internet via a core network. Furthermore, operation, management, and maintenance are performed by a function called Operation, Administration & Maintenance (OA & M). Furthermore, for example, as illustrated in FIG. 1, there may be an intermediate device (network manager) 110C that integrally controls the communication device 110 in the network. Note that there may be cases where the intermediate device is the communication device 110 or cases where the intermediate device is the communication control device 130.

The terminal 120 (User Equipment, User Terminal, User Station, Mobile Terminal, Mobile Station, or the like) is a device that performs wireless communication by a wireless communication service provided by the communication device 110. Typically, a communication device such as a smartphone corresponds to the terminal 120. Note that a device having a wireless communication function can correspond to the terminal 120. For example, a device such as a business camera having a wireless communication function can also correspond to the terminal 120 even if the wireless communication is not a main application. Furthermore, a communication device that transmits data to the terminal 120, such as a wireless station for broadcasting business (field pickup unit (FPU)) that transmits an image for television broadcasting or the like from an outside (site) of a broadcast station to the broadcast station in order to broadcast sports or the like, also corresponds to the terminal 120. Furthermore, the terminal 120 is not necessarily used by a person. For example, like what is called machine type communication (MTC), a device such as a factory machine or a sensor installed in a building may be network-connected to operate as the terminal 120. Furthermore, a device called customer premises equipment (CPE) provided to ensure connection to the Internet may behave as the terminal 120.

Furthermore, as represented by device-to-device (D2D) and vehicle-to-everything (V2X), the terminal 120 may include a relay communication function.

Furthermore, similarly to the communication device 110, the terminal 120 does not need to be fixedly installed or exist on the ground. For example, an object existing in the air or space, such as an aircraft, a drone, a helicopter, a satellite, or the like, may operate as the terminal 120. Furthermore, for example, an object existing on the sea or under the sea, such as a ship or a submarine, may operate as the terminal 120.

In the present disclosure, unless otherwise noted, the terminal 120 corresponds to an entity that terminates a wireless link using a spectrum that requires permission of the communication control device 130. However, depending on a function included in the terminal 120 or an applied network topology, the terminal 120 can perform an operation equivalent to that of the communication device 110. In other words, depending on the network topology, there may be cases where a device that can correspond to the communication device 110 such as a wireless access point corresponds to the terminal 120, or cases where a device that can correspond to the terminal 120 such as a smartphone corresponds to the communication device 110.

The communication control device 130 is typically a device that determines, permits, gives an instruction on, and/or manages communication parameters of the communication device 110. For example, database servers called TV white space database (TVWSDB), geolocation database (GLDB), spectrum access system (SAS), and automated frequency coordination (AFC) correspond to the communication control device 130. Furthermore, for example, a control device that performs radio wave interference control between devices defined by standards represented by EN 303 387 of the European Telecommunications Standards Institute (ETSI), the Institute of Electrical and Electronics Engineers (IEEE) 802.19.1-2018, CBRSA-TS-2001, or the like also corresponds to the communication control device 130. Furthermore, for example, a registered location secure server (RLSS) defined in IEEE 802.11-2016 also corresponds to the communication control device 130. That is, not limited to these examples, an entity responsible for determination, use permission, instruction, management, and the like of the communication parameters of the communication device 110 may be referred to as the communication control device 130. Basically, the control target of the communication control device 130 is the communication device 110, but the communication control device 130 may control the terminal 120 subordinate to the communication device 110.

There may be a plurality of communication control devices 130. In a case where there is a plurality of communication control devices 130, at least one of the following three types of decision-making topologies can be applied to the communication control device 130.

Figure 2:
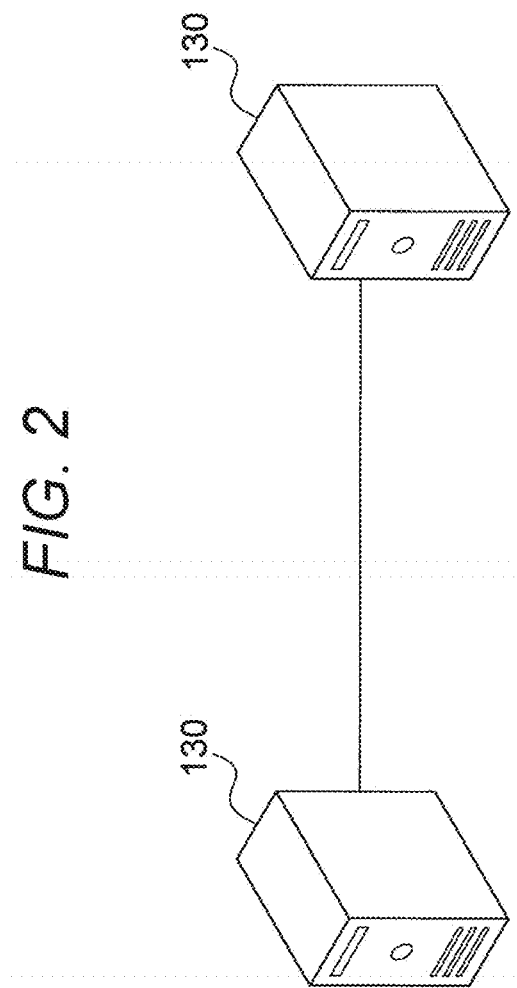
FIG. 2 is a diagram illustrating a network configuration to which autonomous decision-making can be applied.

Autonomous decision-making
    Centralized decision-making
    Distributed decision-making The autonomous decision-making is a decision-making topology in which an entity (the decision-making entity, here the communication control device 130) that makes a decision makes a decision independently from another decision-making entity. The communication control device 130 independently calculates necessary spectrum allocation and interference control. For example, in a case where a plurality of communication control devices 130 is arranged in a distributed manner as illustrated in FIG. 2, the autonomous decision-making can be applied.

Figure 3:
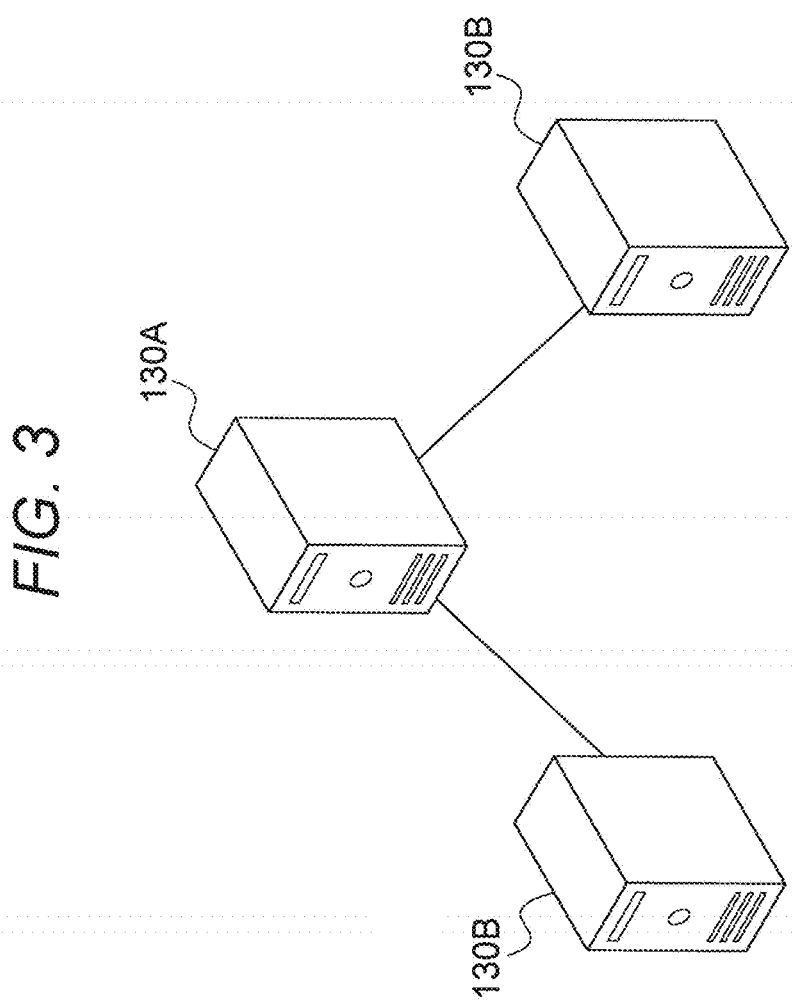
FIG. 3 is a diagram illustrating a network configuration to which centralized decision-making can be applied.

The centralized decision-making is a decision-making topology in which a decision-making entity delegates decision-making to another decision-making entity. In a case where the centralized decision-making is performed, for example, a model as illustrated in FIG. 3 can be assumed. FIG. 3 illustrates a model (what is called master-slave type) in which one communication control device 130 centrally controls a plurality of communication control devices 130. In the model of FIG. 3, the communication control device 130A, which is the master, can control the communication control devices 130B, which are a plurality of slaves, to intensively make decisions.

The distributed decision-making (distributed decision-making) is a decision-making topology in which a decision-making entity makes a decision in cooperation with another decision-making entity. For example, while a plurality of communication control devices 130 independently makes a decision as in the autonomous decision-making in FIG. 2, mutual adjustment of decision-making results, negotiation, and the like performed by each communication control device 130 after making a decision may correspond to "distributed decision-making". Furthermore, for example, in the centralized decision-making in FIG. 3, for the purpose of load balancing or the like, performing dynamic delegation of decision-making authority to each slave communication control device 130B, deletion thereof, or the like by the master communication control device 130A can also be regarded as "distributed decision-making".

Figure 4:
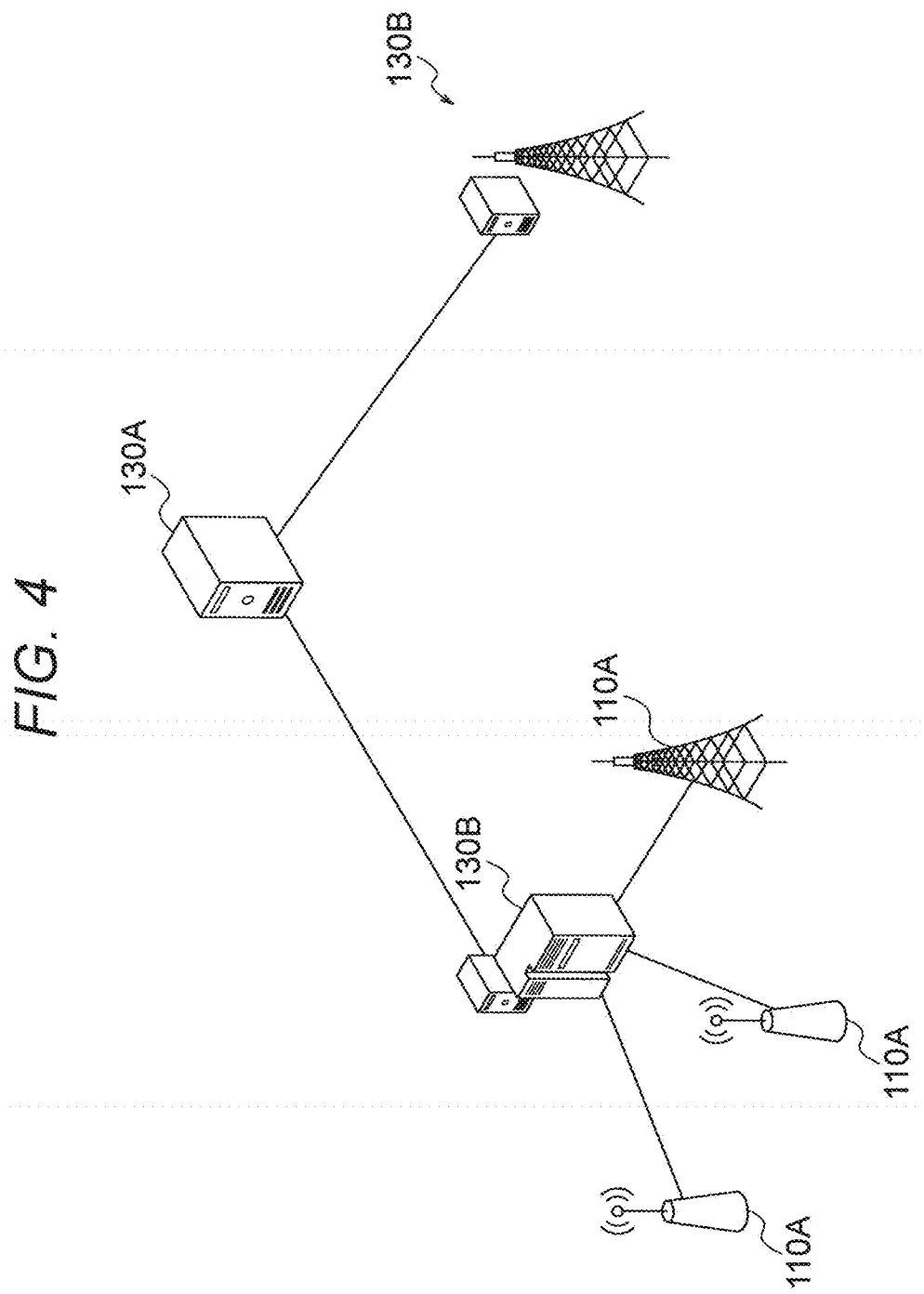
FIG. 4 is a diagram illustrating a network configuration in a case where both centralized decision-making and distributed decision-making are applied.

There may be cases where both the centralized decision-making and the distributed decision-making are applied. In FIG. 4, the slave communication control device 130B operates as an intermediate device that bundles the plurality of communication devices 110. It is not necessary for the master communication control device 130A to control the communication devices 110 bundled by the slave communication control device 130B, that is, the secondary system configured by the slave communication control device 130B. As described above, as a modification example, implementation as illustrated in FIG. 4 is also possible.

The communication control device 130 may also acquire necessary information from entities other than the communication device 110 and the terminal 120 of the communication network 100 for its role. Specifically, for example, information necessary for protecting the primary system can be acquired from a database (regulatory database) managed or operated by a radio administration agency (national regulatory authority (NRA)) of a country or a region. Examples of the regulatory database include the Universal Licensing System (ULS) operated by the Federal Communications Commission (FCC), and the like. Examples of information necessary for protecting the primary system include position information of the primary system, communication parameters of the primary system, out-of-band emission limit (OOBE), adjacent channel leakage ratio (ACLR), adjacent channel selectivity, fading margin, protection ratio (PR), and the like. In a region where a fixed numerical value, an acquisition method, a derivation method, and the like are defined by a law or the like in order to protect the primary system, it is desirable to use information defined by the law as information necessary for protecting the primary system.

Furthermore, a database that records the communication device 110 and the terminal 120 that have been subjected to conformity authentication, such as an equipment authorization system (EAS) managed by the Office of Engineering and Technology (OET) of the FCC, also corresponds to the regulatory database. From such a regulatory database, information regarding the operable spectrum of the communication device 110 and the terminal 120, information regarding the maximum EIRP, and the like can be acquired. Naturally, the communication control device 130 may use these pieces of information for protecting the primary system.

Furthermore, it can also be assumed that the communication control device 130 acquires radio wave sensing information from a radio wave sensing system installed and operated for the purpose of radio wave detection in the primary system. As a specific example, in Citizens Broadband Radio Service (CBRS) in the United States, the communication control device 130 acquires radio wave detection information of a ship radar as a primary system from a radio wave sensing system called an environmental sensing capability (ESC). Furthermore, in a case where the communication device 110 and the terminal 120 have a sensing function, the communication control device 130 may acquire radio wave detection information of the primary system from these.

The interface between the respective entities constituting this system model may be wired or wireless. For example, not only a wired line but also a wireless interface that does not depend on spectrum sharing may be used as an interface between the communication control device 130 and the communication device 110. Examples of the wireless interface that does not depend on spectrum sharing include a wireless communication line provided by a mobile communication carrier via a licensed band, Wi-Fi communication using an existing license-exempt band, and the like.

<1.2 Terms Related to Spectrum and Sharing>

As described above, the present embodiment will be described assuming a dynamic spectrum sharing (Dynamic Spectrum Access) environment. As a representative example of the dynamic spectrum sharing, a mechanism defined by the CBRS in the United States (that is, a mechanism defined in Part 96 Citizens Broadband Radio Service of the FCC Rules of the United States) will be described.

Figure 5:
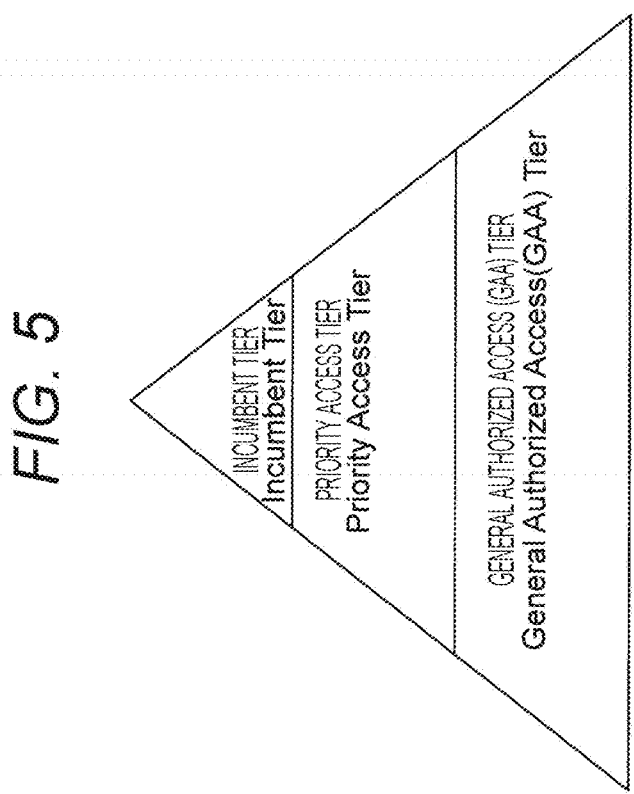
FIG. 5 is a diagram describing a three-tier structure in CBRS.

In the CBRS, as illustrated in FIG. 5, each of users in the shared frequency band is classified into one of three groups. This group is referred to as a tier. The three groups are referred to as an incumbent tier (existing layer), a priority access tier (priority access layer), and a general authorized access (GAA) tier (general authorized access layer), respectively.

The incumbent tier is a group including existing users who conventionally use a frequency band defined as a shared frequency band. The existing user is also generally referred to as a primary user. In the CBRS, the Department of Defense (DOD), fixed satellite operators, and new rule excepted radio broadband licensees (Grandfathered Wireless Broadband Licensees (GWBL)) in the United States are defined as existing users. The incumbent tier is not required to avoid interference to the priority access tier and the GAA tier with lower priorities or to suppress use of the shared frequency band. Furthermore, the incumbent tier is protected from interference by the priority access tier and the GAA tier. That is, users of the incumbent tier can use the shared frequency band without considering the existence of other groups.

The priority access tier is a group of users who use the shared frequency band on the basis of the above-described priority access license (PAL). A user of the priority access tier is also generally referred to as a secondary user. When the shared frequency band is used, the priority access tier is required to avoid interference and to suppress use of the shared frequency band for the incumbent tier having a higher priority than the priority access tier. On the other hand, neither avoiding interference nor suppressing use of the shared frequency band is required for the GAA tier having a lower priority than the priority access layer. Furthermore, the priority access tier is not protected from interference by the incumbent tier with a higher priority, but is protected from interference by the GAA tier with a lower priority.

The GAA tier is a group formed by shared frequency band users that do not belong to the incumbent tier and the priority access tier. Similarly to the priority access tier, in general, a user of the GAA tier is also referred to as a secondary user. However, since the priority of shared use is lower than that of the priority access tier, it is also referred to as a low priority secondary user. When the shared frequency band is used, the GAA tier is required to avoid interference and suppress use of the shared frequency band for the incumbent tier and the priority access tier having higher priorities. Furthermore, the GAA tier is not protected from interference by the incumbent tier and priority access tier with higher priority. That is, the GAA tier is a tier that is required to use an opportunistic shared frequency band in the laws.

Although the CBRS mechanism has been described above as a representative example of the dynamic spectrum sharing, the present embodiment is not limited to the definition of CBRS. For example, as illustrated in FIG. 5, the CBRS generally employs a three-tier structure, but a two-tier structure may be employed in the present embodiment. Typical examples of the two-tier structure include authorized shared access (ASA), licensed shared access (LSA), evolved LSAs (eLSAs), and TV band white space (TVWS). In the ASA, the LSA, and the eLSA, there is no GAA tier, and a structure equivalent to a combination of the incumbent tier and the priority access tier is employed. Further, in the TVWS, there is no priority access tier, and a structure equivalent to a combination of the incumbent tier and the GAA tier is employed. Furthermore, there may be four or more tiers. Specifically, for example, four or more tiers may be generated by providing a plurality of intermediate layers corresponding to the priority access tiers and giving different priorities to the respective intermediate layers, and the like. Furthermore, for example, the tiers may be increased by similarly dividing the GAA tier and giving priorities, and the like. That is, each group may be divided.

Furthermore, the primary system of the present embodiment is not limited to the definition of CBRS. For example, as an example of the primary system, a wireless system such as TV broadcasting, a fixed microwave line (fixed system (FS)), a meteorological radar, a radio altimeter, a wireless train control system (communications-based train control), and a radio astronomy is assumed and, without being limited thereto, any wireless system can be the primary system of the present embodiment.

Furthermore, as described above, the present embodiment is not limited to the environment of spectrum sharing. In general, in spectrum sharing or spectrum secondary use, an existing system that uses a target frequency band is referred to as a primary system, and a secondary user is referred to as a secondary system. However, in a case where the present embodiment is applied to an environment other than the spectrum sharing environment, they should be read by replacing with other terms. For example, a macrocell base station in a heterogeneous network (HetNet) may be the primary system, and a small cell base station or a relay station may be the secondary system. Furthermore, the base station may be a primary system, and a relay user equipment (UE) or a vehicle UE that implements D2D or V2X existing within its coverage may be the secondary system. The base station is not limited to a fixed type, and may be a portable type or a mobile type. In such a case, for example, the communication control device 130 of the present embodiment may be included in a core network, a base station, a relay station, a relay UE, or the like.

Furthermore, in a case where the present embodiment is applied to an environment other than the spectrum shared environment, the term "frequency" in the present disclosure is replaced with another term shared by the application destination. For example, terms such as "resource", "resource block", "resource element", "resource pool", "channel", "component carrier", "carrier", "subcarrier", and "bandwidth part (BWP)" or another term having a meaning equivalent or similar thereto are assumed to be used.

<<2. Description of Various Procedures Assumed in Present Embodiment>>

Here, a basic procedure that can be used in the implementation of the present embodiment will be described. Note that up to <2.5> described later will be described on the assumption that the processing is mainly performed in the communication device 110A.

<2.1 Registration Procedure>

A registration procedure is a procedure for registering information of a wireless system that intends to use the shared frequency band. More specifically, it is a procedure for registering a device parameter related to the communication device 110 of the wireless system in the communication control device 130. Typically, the registration procedure is started by that the communication device 110 representing a wireless system that intends to use the shared frequency band notifies the communication control device 130 of a registration request including a device parameter. Note that in a case where a plurality of communication devices 110 belongs to the wireless system that intends to use the shared frequency band, the device parameter of each of the plurality of communication devices is included in the registration request. Furthermore, a device that transmits the registration request as a representative of the wireless system may be appropriately determined.

<2.1.1 Details of Required Parameters>

The device parameter refers to, for example, the following information.

- Information regarding the user of the communication device 110 (hereinafter described as user information)
- Information unique to the communication device 110 (hereinafter described as unique information)
- Information regarding the position of the communication device 110 (hereinafter described as position information)
- Information regarding an antenna included in the communication device 110 (hereinafter described as antenna information)
- Information regarding the wireless interface included in the communication device 110 (hereinafter described as wireless interface information)
- Legal information regarding the communication device 110 (hereinafter described as legal information)
- Information regarding the installer of the communication device 110 (hereinafter described as installer information)
- Information regarding the group to which the communication device 110 belongs (hereinafter, group information)

The device parameter is not limited to the above. Information other than these may be handled as the device parameter. Note that the device parameter does not need to be transmitted once, and may be transmitted a plurality of times. That is, a plurality of registration requests may be transmitted for one registration procedure. In this manner, one procedure or one process in the procedure may be performed a plurality of times. This similarly applies to the procedure described below.

The user information is information related to the user of the communication device 110. For example, a user ID, an account name, a user name, a user contact address, a call sign, and the like can be assumed. The user ID and the account name may be independently generated by the user of the communication device 110 or may be issued in advance by the communication control device 130. As the call sign, it is desirable to use a call sign issued by the NRA.

The user information can be used, for example, in an application of interference resolution. As a specific example, in the spectrum use notification procedure described in <2.5> to be described later, even if the communication control device 130 makes the use stop determination on the spectrum being used by the communication device 110 and gives an instruction based on the use stop determination, there may be a case where the spectrum use notification request of the spectrum is continuously notified. In this case, suspecting a failure of the communication device 110, the communication control device 130 can give a behavior check request for the communication device 110 to the user contact address included in the user information. Not limited to this example, in a case where it is determined that the communication device 110 is performing an operation against communication control performed by the communication control device 130, the communication control device 130 can make a contact using the user information.

The unique information is information that can specify the communication device 110, product information of the communication device 110, information regarding hardware or software of the communication device 110, and the like.

The information that can specify the communication device 110 can include, for example, a manufacturing number (serial number) of the communication device 110, an ID of the communication device 110, and the like. The ID of the communication device 110 may be uniquely assigned by the user of the communication device 110, for example.

The product information of the communication device 110 can include, for example, information regarding an authentication ID, a product model number, a manufacturer, and the like. The authentication ID is, for example, an ID given from a certificate authority in each country or region, such as an FCC ID in the United States, a CE number in Europe, and a technical standards conformity certification (technical conformity) in Japan. An ID issued by an industry association or the like on the basis of a unique authentication program may also be regarded as the authentication ID.

The unique information represented by these can be used, for example, in the application of a whitelist or a blacklist. For example, in a case where any piece of information regarding the communication device 110 in operation is included in the blacklist, the communication control device 130 can instruct the communication device 110 to stop using the spectrum in the spectrum use notification procedure described in <2.5> described later. Moreover, the communication control device 130 can take a behavior of not canceling the usage stop measure until the communication device 110 is cancelled from the blacklist. Furthermore, for example, the communication control device 130 can reject registration of the communication device 110 included in the blacklist. Furthermore, for example, the communication control device 130 can also perform an operation that does not consider the communication device 110 corresponding to the information included in the blacklist in the interference calculation of the present disclosure or that considers only the communication device 110 corresponding to the information included in the whitelist in the interference calculation.

The information regarding the hardware of the communication device 110 can include, for example, transmission power class information. For example, in FCC Code of Federal Regulations (C.F.R.) Part 96 in the United States, two types of classes Category A and Category B are defined as the transmission power class information, and information regarding the hardware of the communication device 110 conforming to the definition can include information regarding which of the two types of classes it belongs to. Furthermore, in Technical Specification (TS) 36.104 and TS38.104 of 3rd Generation Partnership Project (3GPP), some classes of eNodeB and gNodeB are defined, and these definitions can also be used.

The transmission power class information can be used, for example, in an application of interference calculation. The interference calculation can be performed using the maximum transmission power defined for each class as the transmission power of the communication device 110.

The information regarding the software of the communication device 110 can include, for example, version information, a build number, and the like regarding an execution program in which processing necessary for interaction with the communication control device 130 is described. Furthermore, version information, a build number, and the like of software for operating as the communication device 110 may also be included.

The position information is typically information that can specify the position of the communication device 110. For example, it is coordinate information acquired by a positioning function represented by the Global Positioning System (GPS), Beidou, the Quasi-Zenith Satellite System (QZSS), Galileo, or the Assisted Global Positioning System (A-GPS). Typically, information related to latitude, longitude, ground level or sea level, altitude, and positioning error can be included. Alternatively, for example, the position information may be position information registered in an information management device managed by the National Regulatory Authority (NRA) or its entrusted institution. Alternatively, for example, coordinates of an X axis, a Y axis, and a Z axis with a specific geographical position as an origin may be used. Furthermore, together with such coordinate information, an identifier indicating whether the communication device 110 exists outdoors or indoors can be given.

Furthermore, the position information may be information indicating a region in which the communication device 110 is located. For example, information indicating a region determined by the government, such as a postal code or an address, may be used. Furthermore, for example, the region may be indicated by a set of three or more geographic coordinates. These pieces of information indicating the region may be provided together with the coordinate information.

Furthermore, in a case where the communication device 110 is located indoors, information indicating the floor of a building where the communication device 110 is located can also be included in the position information. For example, an identifier indicating the number of floors, the ground, or the underground, or the like can be included in the position information. Furthermore, for example, information indicating a further closed space inside a building, such as a room number and a room name in the building, can be included in the position information.

Typically, the positioning function is desirably included in the communication device 110. However, there may be cases where performance of the positioning function does not meet the required accuracy. Furthermore, even if performance of the positioning function satisfies the required accuracy, it may not always be possible to acquire the position information that satisfies the required accuracy depending on the installation position of the communication device 110. Therefore, a device different from the communication device 110 may include the positioning function, and the communication device 110 may acquire information related to the position from the device. The device having the positioning function may be an available existing device, or may be provided by an installer of the communication device 110. In such a case, it is desirable that the position information measured by the installer of the communication device 110 is written in the communication device 110.

The antenna information is typically information indicating performance, a configuration, and the like of an antenna included in the communication device 110. Typically, for example, information such as an antenna installation height, a tilt angle (downtilt), a horizontal orientation (azimuth), a boresight, an antenna peak gain, and an antenna model can be included.

Furthermore, the antenna information can also include information regarding a formable beam. For example, information such as a beam width, a beam pattern, and an analog or digital beamforming capability can be included.

Furthermore, the antenna information can also include information regarding performance and configuration of multiple input multiple output (MIMO) communication. For example, information such as the number of antenna elements and the maximum number of spatial streams can be included. Furthermore, codebook information to be used, weight matrix information, and the like can also be included. The weight matrix information includes a unitary matrix, a zero-forcing (ZF) matrix, a minimum mean square error (MMSE) matrix, and the like, which are obtained by singular value decomposition (SVD), eigen value decomposition (EVD), block diagonalization (BD), and the like. Furthermore, in a case where the communication device 110 includes a function such as maximum likelihood detection (MLD) that requires nonlinear calculation, information indicating the included function may be included in the antenna information.

Furthermore, the antenna information may include a zenith of direction, departure (ZoD). The ZoD is a type of radio wave arrival angle. Note that instead of being notified from the communication device 110, the ZoD may be estimated and notified by another communication device 110 from radio waves radiated from the antenna of the communication device 110. In this case, the communication device 110 may be a device that operates as a base station or an access point, a device that performs D2D communication, a moving relay base station, or the like. The ZoD may be estimated by a radio wave direction of arrival estimation technology such as multiple signal classification (MUSIC) or estimation of signal propagation via rotation invariance techniques (ESPRIT). Furthermore, the ZoD can be used by the communication control device 130 as measurement information.

The wireless interface information is typically information indicating a wireless interface technology included in the communication device 110. For example, identifier information indicating a technology used in GSM, CDMA2000, UMTS, E-UTRA, E-UTRA NB-IoT, 5G NR, 5G NR NB-IoT or a further next generation cellular system can be included as the wireless interface information. Furthermore, identifier information indicating a derivative technology based on Long Term Evolution (LTE)/5G such as MulteFire, Long Term Evolution-Unlicensed (LTE-U), or NR-Unlicensed (NR-U) can be included. Furthermore, identifier information indicating a standard technology such as a metropolitan area network (MAN) such as WiMAX or WiMAX2+ or a wireless LAN of the IEEE 802.11 series can also be included. Furthermore, identifier information indicating an extended global platform (XGP) or a shared XGP (sXGP) may be used. It may be identifier information of a communications technology for local power, wide area (LPWA). Further, identifier information indicating a proprietary wireless technology can also be included. Furthermore, a version number or a release number of the technical specification that defines these technologies may also be included as the wireless interface information.

Furthermore, the wireless interface information can also include frequency band information supported by the communication device 110. For example, the frequency band information can be represented by an upper limit frequency, a lower limit frequency, a center frequency, a bandwidth, a 3GPP operating band number, or a combination of at least two of these, or the like. Furthermore, one or more pieces of frequency band information can be included in the wireless interface information.

The frequency band information supported by the communication device 110 can further include information indicating capability of a band extension technology such as carrier aggregation (CA) or channel bonding. For example, combinable band information or the like can be included. Further, the carrier aggregation can also include information regarding a band desired to be used as a primary component carrier (PCC) or a secondary component carrier (SCC). Furthermore, the number of component carriers (the number of CCs) that can be aggregated at the same time can be included.

The frequency band information supported by the communication device 110 may further include information indicating a combination of frequency bands supported by the dual connectivity and the multi connectivity. In addition, information of another communication device 110 that cooperatively provides the dual connectivity and the multi connectivity may also be provided. The communication control device 130 may perform determination of the communication control disclosed in the present embodiment in consideration of another communication device 110 having a cooperative relationship or the like in subsequent procedures.

The frequency band information supported by the communication device 110 may also include information indicating radio wave usage priority such as PAL and GAA.

Furthermore, the wireless interface information can also include modulation scheme information supported by the communication device 110. For example, as a representative example, information indicating a primary modulation scheme such as frequency shift keying (FSK), n-value phase shift keying (PSK, where n is a multiplier of two, such as two, four, eight, or the like), and n-value quadrature amplitude modulation (QAM, where n is a multiplier of four, such as four, 16, 64, 256, 1024) can be included. Furthermore, information indicating a secondary modulation scheme such as orthogonal frequency division multiplexing (OFDM), scalable OFDM, DFT spread OFDM (DFT-s-OFDM), generalized frequency division multiplexing (GFDM), and filter bank multi carrier (FBMC) can be included.

Furthermore, the wireless interface information can also include information regarding an error correction code. For example, capabilities of a turbo code, a low density parity check (LDPC) code, a polar code, an erasure correction code, and the like, and coding rate information to be applied can be included.

The modulation scheme information and the information regarding the error correction code can also be expressed by a modulation and coding scheme (MCS) index as another aspect.

Furthermore, the wireless interface information can also include information indicating a function specific to each wireless technical specification supported by the communication device 110. For example, as a representative example, there is transmission mode (TM) information defined in LTE. In addition, those having two or more modes for a specific function can be included in the wireless interface information such as TM information. Furthermore, in the technical specification, in a case where the communication device 110 supports a function that is not essential in the specification even if there are not two or more modes, information indicating the supported function can also be included.

Furthermore, the wireless interface information can also include radio access technology (RAT) information supported by the communication device 110. For example, information indicating time division multiple access (TDMA), frequency division multiple access (FDMA), orthogonal frequency division multiple access (OFDMA), power division multiple access (PDMA), code division multiple access (CDMA), sparse code multiple access (SCMA), interleave division multiple access (IDMA), spatial division multiple access (SDMA), carrier sense multiple access/collision avoidance (CSMA/CA), carrier sense multiple access/collision detection (CSMA/CD), or the like can be included. Note that the TDMA, FDMA, and OFDMA are classified into orthogonal multiple access (OMA). The PDMA, CDMA, SCMA, IDMA, and SDMA are classified into non-orthogonal multiple access (NOMA). A representative example of the PDMA is a method implemented by a combination of superposition coding (SPC) and successive interference canceller (SIC). The CSMA/CA and CSMA/CD are classified into opportunistic access.

In a case where the wireless interface information includes information indicating the opportunistic access, information indicating details of the access method may be further included. As a specific example, information indicating which of frame based equipment (FBE) and load based equipment (LBE) defined in EN 301 598 of ETSI may be included.

In a case where the radio interface information indicates the LBE, the wireless interface information may further include LBE-specific information such as a priority class specified in EN 301 598 of ETSI.

Furthermore, the wireless interface information can also include information regarding a duplex mode supported by the communication device 110. As a representative example, information regarding a method such as frequency division duplex (FDD), time division duplex (TDD), or full duplex (FD) can be included for example.

In a case where TDD is included as the wireless interface information, TDD frame structure information used or supported by the communication device 110 can be added. Furthermore, information related to the duplex mode may be included for each frequency band indicated by the frequency band information.

In a case where the FD is included as the wireless interface information, information regarding an interference power detection level may be included.

Furthermore, the wireless interface information can also include information regarding a transmission diversity method supported by the communication device 110. For example, space time coding (STC) or the like may be included.

Furthermore, the wireless interface information can also include guard band information. For example, information regarding a predetermined guard band size in the wireless interface can be included. Alternatively, for example, information regarding a guard band size desired by the communication device 110 may be included.

Regardless of the aspects described above, the wireless interface information may be provided for each frequency band.

The legal information is typically information regarding regulations that the communication device 110 has to comply with and defined by the radio administration agency or an equivalent agency in each country or region, authentication information acquired by the communication device 110, or the like. Typically, the information regarding the regulations can include, for example, upper limit value information of out-of-band radiation, information regarding a blocking characteristic of the receiver, and the like. Typically, the authentication information can include, for example, type approval information, legal regulation information serving as a reference of authentication acquisition, and the like. The type approval information corresponds to, for example, FCC ID in the United States, the technical standards conformity certification in Japan, and the like. The legal regulation information corresponds to, for example, FCC regulation numbers in the United States, ETSI Harmonized Standard number in Europe, and the like.

Among the legal information, regarding numerical values, those defined in the standard specification of wireless interface technology may be substituted. The standard specification of the wireless interface technology corresponds to, for example, 3GPP TS36.104 or TS38.104. An adjacent channel leakage ratio (ACLR) is defined therein. Instead of the upper limit information of the out-of-band radiation, the upper limit of the out-of-band radiation may be derived and used using the ACLR defined in the standard specification. Further, the ACLR itself may be used as necessary. Furthermore, adjacent channel selectivity (ACS) may be used instead of the blocking characteristic. Further, these may be used in combination, or an adjacent channel interference ratio (ACIR) may be used. Note that, in general, the ACIR has the following relationship with the ACLR and ACS.

[Expression 1]

$$ACIR = \left(\frac{1}{ACS} + \frac{1}{ACLR}\right)^{-1} \quad (1)$$

Note that although Expression (1) uses true value expression, Expression (1) may be expressed by logarithmic expression.

The installer information can include information capable of specifying a person who installs the communication device 110 (installer), unique information associated with the installer, and the like. Typically, the installer information can include information regarding a person who is responsible for the position information of the communication device 110, such as a certified professional installer (CPI) defined in Non-Patent Document 3. The CPI discloses certified professional installer registration ID (CPIR-ID) and CPI name. Furthermore, as unique information associated with the CPI, for example, a contact address (mailing address or contact address), an e-mail address, a telephone number, a public key identifier (PKI), and the like are disclosed. It is not limited thereto, and other information related to the installer may be included in the installer information as necessary.

The group information can include information regarding the communication device group to which the communication device 110 belongs. Specifically, for example, information related to the same or equivalent type of group as disclosed in WINNF-SSC-0010 can be included. Furthermore, for example, in a case where the communication carrier manages the communication devices 110 in units of groups according to its own operation policy, information regarding the groups can be included in the group information.

Figure 6:
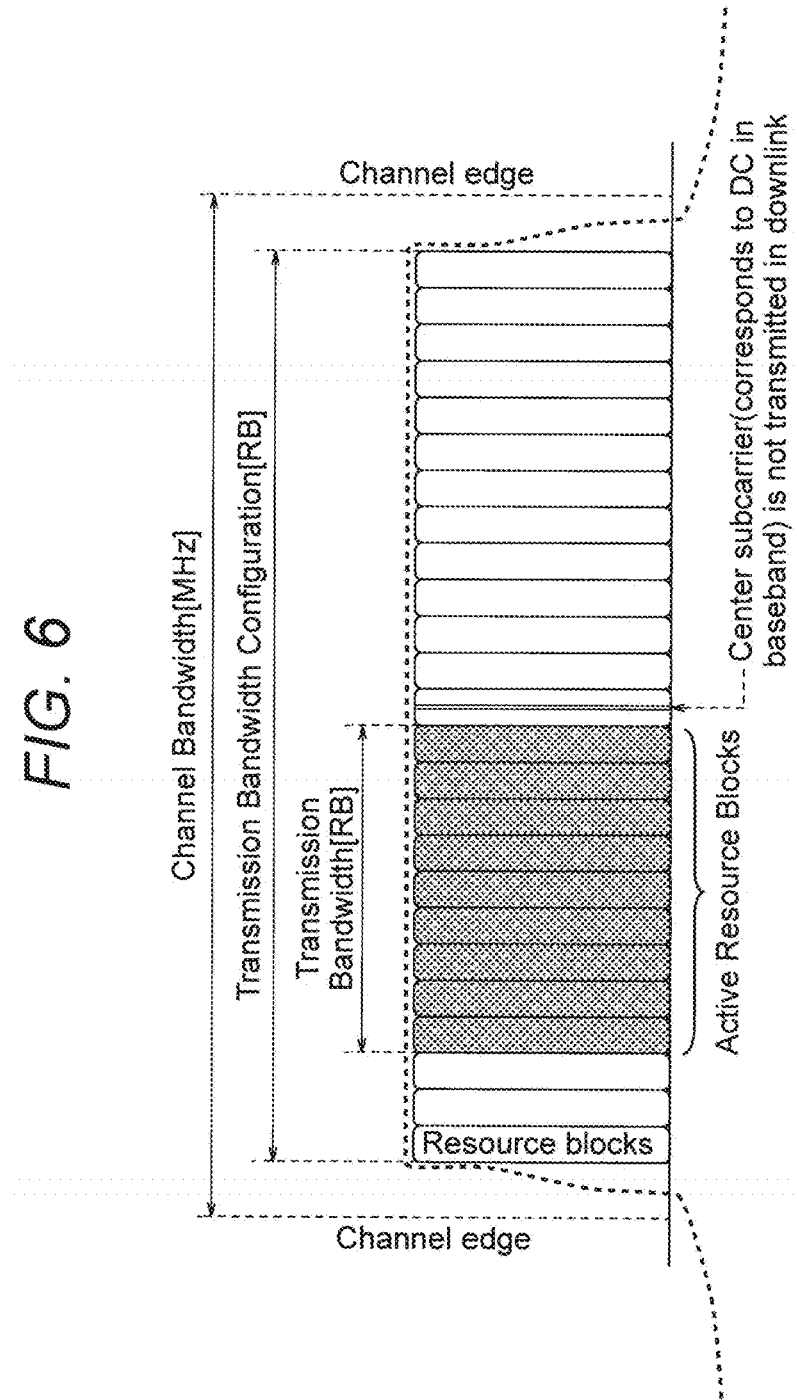
FIG. 6 is a diagram illustrating transmission bandwidth specifications of E-UTRA.
Figure 7:
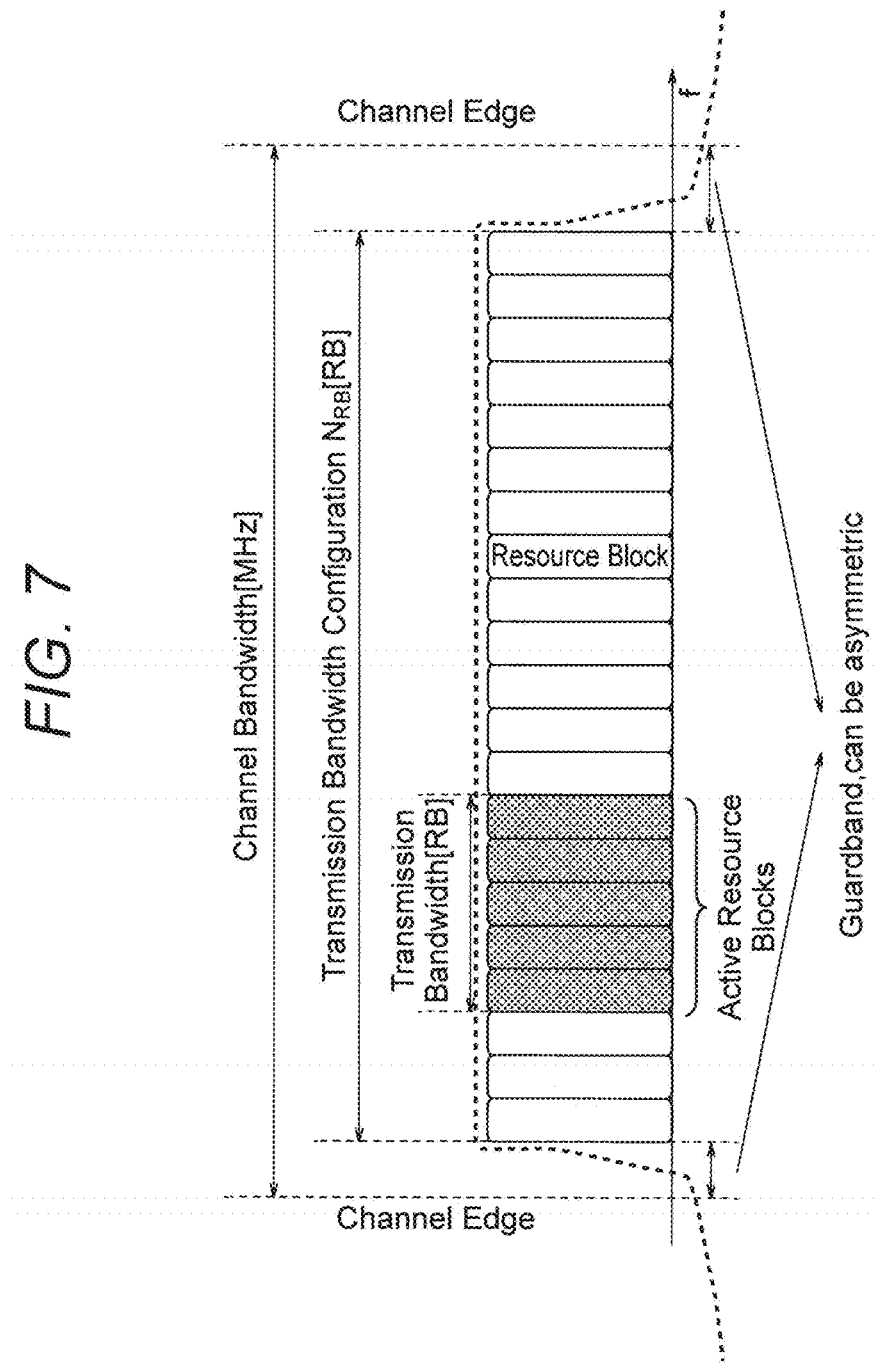
FIG. 7 is a diagram illustrating transmission bandwidth specifications of 5G NR.

The information listed so far may be estimated by the communication control device 130 from other information provided from the communication device 110 without the communication device 110 providing the information to the communication control device 130. Specifically, for example, the guard band information can be estimated from the wireless interface information. In a case where the wireless interface used by the communication device 110 is E-UTRA or 5G NR, it can be estimated on the basis of the transmission bandwidth specification of E-UTRA described in 3GPP TS36.104 illustrated in FIG. 6, the transmission bandwidth specification of 5G NR described in 3GPP TS38.104 illustrated in FIG. 7, and tables described in TS38.104 illustrated below.

TABLE 1

Table 5.6-1 Transmission bandwidth configuration NRB in E-UTRA channel bandwidths (Cited from Table 5.6-1 of TS 36.104 of 3GPP)

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

TABLE 2

Table 5.3.3-1 Minumum guardband (KHz) (FRI) (Cited from Table 5.3.3-1 of TS 38.104 of 3GPP)

| SCS (KHz) | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
|---|---|---|---|---|---|---|---|---|---|---|---|---|---|
| 15 | 242.5 | 312.5 | 382.5 | 452.5 | 522.5 | 592.5 | 552.5 | 692.5 | N.A | N.A | N.A | N.A | N.A |
| 30 | 505 | 665 | 645 | 805 | 785 | 945 | 905 | 1045 | 825 | 965 | 925 | 885 | 845 |
| 60 | N.A | 1010 | 990 | 1330 | 1310 | 1290 | 1610 | 1570 | 1530 | 1490 | 1450 | 1410 | 1370 |

TABLE 3

Table 5.3.3-2: Minimum guardband (kHz) (FR2) (Cited from Table: 5.3.3-2 of TS 38.104 of 3GPP)

| SCS (kHz) | 50 MHz | 100 MHz | 200 MHz | 400 Mhz |
|---|---|---|---|---|
| 60 | 1210 | 2450 | 4930 | N.A |
| 120 | 1900 | 2420 | 4900 | 9860 |

TABLE 4

Table: 5.3.3-3: Minimum guardband (kHz) of SCS 240 kHz SS/PBCH block (Cited from TS 38.104 Table: 5.3.3-3 of 3GPP)

| SCS (kHz) | 100 MHz | 200 MHz | 400 MHz |
|---|---|---|---|
| 249 | 3800 | 7720 | 15560 |

In other words, it is sufficient that the communication control device 130 can acquire the information listed so far, and the communication device 110 is not necessarily required to provide the information to the communication control device 130. Furthermore, the intermediate device 130B (for example, a network manager) that bundles the plurality of communication devices 110 does not need to provide the information to the communication control device 130A. Providing information by the communication device 110 or the intermediate device 130B to the communication control device 130 or 130A is merely one means of information provision in the present embodiment. The information listed so far means information that can be necessary for the communication control device 130 to normally complete this procedure, and means for providing the information does not matter.

<2.1.1.1 Supplement of Required Parameters>

In the registration procedure, in some cases, it is assumed that the device parameters related to not only the communication device 110 but also the terminal 120 are required to be registered in the communication control device 130. In such a case, the term "communication device" in the description given in <2.1.1> may be replaced with a term "terminal" or a similar term. Furthermore, a parameter specific to "terminal" that is not described in <2.1.1> may also be handled as a required parameter in the registration procedure. For example, there is a user equipment (UE) category specified in 3GPP, and the like.

<2.1.2 Details of Registration Processing>

As described above, the communication device 110) representing the wireless system that intends to use the shared frequency band generates a registration request including the device parameter and notifies the communication control device 130 of the registration request.

Here, in a case where the installer information is included in the device parameters, the communication device 110 may perform tamper-proof processing or the like on the registration request by using the installer information. Furthermore, a part or all of the information included in the registration request may be subjected to encryption processing. Specifically, for example, a unique public key may be shared in advance between the communication device 110 and the communication control device 130, and the communication device 110 may encrypt information using a secret key corresponding to the public key. Examples of the encryption target include security sensitive information such as position information.

Note that there may be cases where the ID and the position information of the communication device 110 are disclosed, and the communication control device 130 holds in advance the ID and the position information of the main communication device 110 existing in its coverage. In such a case, since the communication control device 130 can acquire the position information from the ID of the communication device 110 that has transmitted the registration request, the position information does not need to be included in the registration request. Furthermore, it is also conceivable that the communication control device 130 returns a necessary device parameter to the communication device 110 that has transmitted the registration request, and in response to this, the communication device 110 transmits a registration request including the device parameter necessary for registration. In this manner, the information included in the registration request may be different depending on the case.

After receiving the registration request, the communication control device 130 performs registration processing of the communication device 110 and returns a registration response according to a processing result. If there is no shortage or abnormality of information necessary for registration, the communication control device 130 records the information in an internal or external storage device and notifies of normal completion. Otherwise, a registration failure is notified. In a case where the registration is normally completed, the communication control device 130 may allocate an ID to each of the communication devices 110 and notify the communication devices of the ID information at the time of response. In a case where the registration fails, the communication device 110 may notify the corrected registration request again. Furthermore, the communication device 110 may change the registration request and try the registration procedure until it is normally completed.

Note that the registration procedure may be executed even after the registration is normally completed. Specifically, for example, the registration procedure can be re-executed in a case where the position information is changed beyond a predetermined standard due to movement, accuracy improvement, or the like. The predetermined standard is typically determined by the legal system in each country or region. For example, in 47 C.F.R. Part 15 in the United States, a Mode II personal/portable white space device, that is, a device using a free spectrum is required to perform registration again in a case where its position changes by 100 meters or more.

<2.2 Available Spectrum Information Query Procedure (Available Spectrum Query Procedure)>

The available spectrum information query procedure is a procedure in which a wireless system that intends to use a shared frequency band inquires of the communication control device 130 for information regarding an available spectrum. Note that the available spectrum information query procedure does not necessarily need to be performed. Furthermore, the communication device 110 that makes an inquiry on behalf of the wireless system that intends to use the shared frequency band may be the same as or different from the communication device 110 that has generated the registration request. Typically, the communication device 110 that makes an inquiry notifies the communication control device 130 of a query request including information that can specify the communication device 110, and thereby the procedure is started.

Here, typically, the available spectrum information is information indicating a spectrum in which the communication device 110 can safely perform secondary use without giving fatal interference to the primary system.

The available spectrum information is determined, for example, on the basis of a secondary use prohibited area called an exclusion zone. Specifically, for example, in a case where the communication device 110 is installed in the secondary use prohibited area provided for the purpose of protecting the primary system using the frequency channel F1, the communication device 110 is not notified of the frequency channel F1 as an available channel.

The available spectrum information can also be determined, for example, by the degree of interference to the primary system. Specifically, for example, in a case where it is determined that the critical interference is given to the primary system even outside the secondary use prohibited area, the frequency channel may not be notified as an available channel. An example of a specific calculation method is described in <2.2.2> described later.

Furthermore, as described above, there may be frequency channels that are not notified as available due to conditions other than primary system protection requirements. Specifically, for example, in order to avoid interference that may occur between the communication devices 110 in advance, there may be cases where a frequency channel being used by another communication device 110 existing in the vicinity of the communication device 110 is not notified as an available channel. In this manner, the available spectrum information set in consideration of interference with the other communication device 110 may be set as, for example, "use recommended frequency information" and provided together with the available spectrum information. That is, the "use recommended spectrum information" is desirably a subset of the available spectrum information.

Even in a case of affecting the primary system, if the influence can be avoided by reducing the transmission power, the same frequency as that of the primary system or the communication device 110 in the vicinity may be notified as an available channel. In such a case, typically, maximum allowable transmission power information is included in the available spectrum information. The maximum allowable transmission power is typically expressed by equivalent isotropic radiated power (EIRP). The present embodiment is not necessarily limited to this, and may be provided by, for example, a combination of antenna power (conducted power) and antenna gain. Moreover, the antenna gain may be set to an allowable peak gain for each spatial direction.

<2.2.1 Details of Required Parameters>

As the information that can specify the wireless system that intends to use the shared frequency band, for example, unique information registered at the time of the registration procedure, the above-described ID information, and the like can be assumed.

Furthermore, the query request can also include query requirement information. The query requirement information can include, for example, information indicating a frequency band for which it is desired to know whether or not it is available. Furthermore, for example, transmission power information can be included. The communication device 110 that makes an inquiry can include transmission power information, for example, in a case where it is desired to know only spectrum information in which it is likely that desired transmission power can be used. The query requirement information does not necessarily need to be included in the query request.

Furthermore, the query request can also include a measurement report. The measurement report includes a result of measurement performed by the communication device 110 and/or the terminal 120. Some or all of the measurement results may be represented by raw data or may be represented by processed data. For example, standardized metrics represented by reference signal received power (RSRP), reference signal strength indicator (RSSI), and reference signal received quality (RSRQ) can be used for measurement.

<2.2.2 Details of Available Spectrum Evaluation Processing>

After receiving the query request, the available spectrum is evaluated on the basis of the query requirement information. For example, as described above, the available spectrum can be evaluated in consideration of existence of the primary system, the secondary use prohibited area thereof, and the communication device 110 in the vicinity.

The maximum allowable transmission power information may be derived. Typically, the maximum allowable transmission power information is calculated by using allowable interference power information in the primary system or a protection zone thereof, position information of a reference point for calculating an interference power level suffered by the primary system, registration information of the communication device 110, and a propagation loss estimation model. Specifically, as an example, it is calculated by the following mathematical expression.

[Expression 2]

$$P_{MaxTx(dBm)} = I_{Th(dBm)} + PL(d)_{(dB)} \quad (2)$$

Here, $P_{MaxTx(dBm)}$ is the maximum allowable transmission power, $I_{Th(dBm)}$ is allowable interference power (limit value of allowable interference power), d is a distance between a predetermined reference point and the communication device 110, and $PL(d)_{(dB)}$ is a propagation loss at the distance d. In Expression (2), the antenna gain in a transceiver is not included, but the antenna gain in the transceiver may be included according to the maximum allowable transmission power expression method (EIRP, conducted power, and the like) or the reception power reference point (antenna input point, antenna output point, and the like). Further, a safety margin or the like for compensating for variation due to fading may be included. Furthermore, feeder loss may be considered as necessary.

Furthermore, Expression (2) is described on the basis of the assumption that a single communication device 110 is an interference source (single station interference). For example, in a case where it is necessary to consider aggregated interference from a plurality of communication devices 110 at the same time, a correction value may be added. Specifically, for example, the correction value can be determined on the basis of three (fixed/predetermined, flexible, flexible minimized) interference margin methods disclosed in Non-Patent Document 4 (ECC Report 186).

Note that the allowable interference power information itself is not necessarily directly available as in Expression (2). For example, in a case where a required signal power-to-interference power ratio (SIR) of the primary system, a signal to interference plus noise ratio (SINR), and the like are available, they may be converted into allowable interference power and used. Note that such conversion processing is not limited to this processing, and may be applied to processing of other procedures.

Note that although Expression (2) is expressed using logarithms, as a matter of course, it may be used by converting into true numbers at the time of implementation. Furthermore, all parameters in logarithmic notation described in the present disclosure may be used by appropriately converting into true numbers.

Furthermore, in a case where the above-described transmission power information is included in the query requirement information, the available spectrum can be evaluated by a method different from the above-described method. Specifically, for example, in a case where it is assumed that desired transmission power indicated by transmission power information is used, when an estimated interference quantity is less than allowable interference power in the primary system or a protection zone thereof, it is determined that the frequency channel is available, and the communication device 110 is notified of the frequency channel.

Furthermore, for example, in a case where an area or a space in which the communication device 110 can use the shared frequency band is determined in advance similarly to an area of a radio environment map (REM), the available spectrum information may be simply derived on the basis of only coordinates (coordinates or latitude, longitude, and ground level of x-axis, y-axis, and z-axis of communication device 110) included in the position information of the communication device 110. Furthermore, for example, even in a case where a lookup table that associates coordinates of a position of the communication device 110 with available spectrum information is prepared, the available spectrum information described above may be derived on the basis of only the position information of the communication device 110. As described above, there are various methods for the method of determining the available spectrum, and it is not limited to the example of the present disclosure.

Furthermore, in a case where the communication control device 130 acquires information regarding capability of a band extension technology such as carrier aggregation (CA) or channel bonding as the frequency band information supported by the communication device 110, the communication control device 130 may include an available combination, a recommended combination, or the like thereof in the available spectrum information.

Furthermore, in a case where the communication control device 130 acquires information regarding a combination of frequency bands supported by the dual connectivity and the multi connectivity as the frequency band information supported by the communication device 110, the communication control device 130 may include information such as an available spectrum and a recommended spectrum in the available spectrum information for the dual connectivity and the multi connectivity.

Furthermore, in a case of providing the available spectrum information for the band extension technology as described above, when the imbalance of the maximum allowable transmission power occurs between the plurality of frequency channels, the available spectrum information may be provided after adjusting the maximum allowable transmission power of each frequency channel. For example, from a perspective of primary system protection, the maximum allowable transmission power of each frequency channel may be aligned with the maximum allowable transmission power of a frequency channel having a low maximum allowable power flux density (power spectral density (PSD)).

The evaluation of the available spectrum does not necessarily need to be performed after the query request is received. For example, after normal completion of the above-described registration procedure, the communication control device 130 may independently perform the procedure without a query request. In such a case, an REM, a lookup table, or an information table similar to those described above as an example may be created.

Furthermore, the radio wave use priority such as PAL or GAA may also be evaluated. For example, in a case where the registered device parameter or the query requirement includes information regarding the priority of radio wave use, it may be determined whether spectrum use is possible on the basis of the priority, and the notification may be made. Furthermore, for example, as disclosed in Non-Patent Document 3, in a case where information (In Non-Patent Document 3, it is referred to as a cluster list) regarding the communication device 110 that performs high priority use (for example, PAL) from the user is registered in the communication control device 130 in advance, evaluation may be performed on the basis of the information.

After the evaluation of the available spectrum is completed, the communication control device 130 notifies the communication device 110 of the evaluation result.

The communication device 110 may select a desired communication parameter by using the evaluation result received from the communication control device 130.

<2.3 Spectrum Grant Procedure>

The spectrum grant procedure is a procedure for the wireless system that intends to use the shared frequency band to receive the secondary use permission of the spectrum from the communication control device 130. The communication device 110 that performs the spectrum grant procedure as a representative of the wireless system may be the same as or different from the communication device 110 that has performed the procedure so far. Typically, the communication device 110 notifies the communication control device 130 of a spectrum use permission request including information that can specify the communication device 110, thereby starting the procedure. Note that, as described above, the available spectrum information query procedure is not essential. Therefore, the spectrum grant procedure may be performed next to the available spectrum information query procedure, or may be performed next to a registration procedure.

In the present embodiment, it is assumed that at least the following two types of spectrum use permission request methods can be used.

Designation method
Flexible method

The designation method is a request method in which the communication device 110 designates a desired communication parameter and requests the communication control device 130 to permit operation based on the desired communication parameter. The desired communication parameter includes, but is not particularly limited to, a frequency channel to be used, a maximum transmission power, and the like. For example, a wireless interface technology specific parameter (such as a modulation scheme or a duplex mode) may be designated. Furthermore, information indicating radio wave use priority such as PAL and GAA may be included.

The flexible method is a request method in which the communication device 110 designates only a requirement regarding a communication parameter and requests the communication control device 130 to designate a communication parameter that can be permitted for secondary use while satisfying the requirement. Examples of the requirement related to the communication parameter include, but are not particularly limited to, a bandwidth, a desired maximum transmission power, or a desired minimum transmission power, and the like. For example, a wireless interface technology specific parameter (such as a modulation scheme or a duplex mode) may be designated. Specifically, for example, one or more TDD frame structures may be selected in advance and notified.

Similarly to the query request, the spectrum use permission request may also include the measurement report in either the designation method or the flexible method. The measurement report includes a result of measurement performed by the communication device 110 and/or the terminal 120. The measurement may be represented by raw data or processed data. For example, standardized metrics represented by reference signal received power (RSRP), reference signal strength indicator (RSSI), and reference signal received quality (RSRQ) can be used for measurement.

Note that the scheme information used by the communication device 110 may be registered in the communication control device 130 at the time of the registration procedure described in <2.1>.

<2.3.1 Details of Spectrum Use Permission Processing>

After receiving the spectrum use permission request, the communication control device 130 performs spectrum use permission processing on the basis of the spectrum use permission request method. For example, using the method described in <2.2>, it is possible to perform the spectrum use permission processing in consideration of the primary system, the secondary use prohibited area, the presence of the communication device 110 in the vicinity, and the like.

In a case where the flexible method is used, the maximum allowable transmission power information may be derived using the method described in <2.2.2>. Typically, the maximum allowable transmission power information is calculated by using allowable interference power information in the primary system or a protection zone thereof, position information of a reference point for calculating an interference power level suffered by the primary system, registration information of the communication device 110, and a propagation loss estimation model. Specifically, as an example, it is calculated by the above Expression (2).

Furthermore, as described above, Expression (2) is described on the basis of the assumption that the single communication device 110 is an interference source. For example, in a case where it is necessary to consider aggregated interference from a plurality of communication devices 110 at the same time, a correction value may be added. Specifically, for example, the correction value can be determined on the basis of three types of methods (Fixed/Predetermined, Flexible, Flexible Minimized) disclosed in Non-Patent Document 4 (ECC Report 186).

The communication control device 130 can use various propagation loss estimation models in a spectrum grant procedure, available spectrum evaluation processing for an available spectrum information query request, and the like. In a case where a model is designated for each application, it is desirable to use the designated model. For example, in Non-Patent Document 3 (WINNF-TS-0112), a propagation loss model such as Extended Hata (eHATA) or Irregular Terrain Model (ITM) is employed for each application. Of course, the propagation loss model is not limited thereto.

There are also propagation loss estimation models that require information regarding radio wave propagation paths. The information regarding the radio wave propagation path can include, for example, information indicating inside and outside of a line of sight (Line of Sight (LOS) and/or Non Line of Sight (NLOS)), topographical information (undulations, sea levels, and the like), environmental information (Urban, Suburban, Rural, Open Sky, and the like), and the like. When using the propagation loss estimation model, the communication control device 130 may estimate these pieces of information from the registration information of the communication device 110 or the information of the primary system that is already acquired. Alternatively, in a case where there is a parameter designated in advance, it is desirable to use the parameter.

In a case where the propagation loss estimation model is not designated in a predetermined application, the propagation loss estimation model may be selectively used as necessary. For example, when estimating the interference power to the other communication device 110, a model that is calculated with a small loss such as a free space loss model is used, but when estimating the coverage of the communication device 110, a model that is calculated with a large loss can be used.

Furthermore, in a case where the designated propagation loss estimation model is used, as an example, the spectrum use permission processing can be performed by evaluating an interference risk. Specifically, for example, in a case where it is assumed that desired transmission power indicated by transmission power information is used, when an estimated interference quantity is less than the allowable interference power in the primary system or a protection zone thereof, it is determined that use of the frequency channel can be permitted, and the communication device 110 is notified of the determination.

In any method of the designation method and the flexible method, similarly to the query request, the radio wave usage priority such as PAL or GAA may also be evaluated. For example, in a case where the registered device parameter or the query requirement includes information regarding the radio wave usage priority, it may be determined whether the spectrum use is possible on the basis of the priority, and the notification may be made. Furthermore, for example, in a case where information regarding the communication device 110 that performs high priority use (for example, PAL) from the user is registered in the communication control device 130 in advance, evaluation may be performed on the basis of the information. For example, in Non-Patent Document 3 (WINNF-TS-0112), information regarding the communication device 110 is referred to as a cluster list.

The spectrum use permission processing is not necessarily performed due to reception of the spectrum use permission request. For example, after the normal completion of the above-described registration procedure, the communication control device 130 may independently perform without the spectrum use permission request. Furthermore, for example, the spectrum use permission processing may be performed at regular intervals. In such a case, the above-described REM, lookup table, or an information table similar thereto may be created. Thus, the spectrum that can be permitted is determined only by the position information, and thus the communication control device 130 can quickly return a response after receiving the spectrum use permission request.

<2.4 Spectrum Use Notification (Spectrum Use Notification/Heartbeat)>

The spectrum use notification is a procedure in which the wireless system using the shared frequency band notifies the communication control device 130 of the use of the spectrum based on the communication parameter allowed to be used in the spectrum grant procedure. The communication device 110 that performs the spectrum use notification as a representative of the wireless system may be the same as or different from the communication device 110 that has performed the procedure so far. Typically, the communication device 110 notifies the communication control device 130 of a notification message including information that can specify the communication device 110.

The spectrum use notification is desirably performed periodically until the use of the spectrum is rejected from the communication control device 130. In that case, the spectrum use notification is also referred to as a heartbeat.

After receiving the spectrum use notification, the communication control device 130 may determine whether to start or continue the spectrum use (in other words, radio wave transmission at the permitted spectrum). Examples of the determination method include confirmation of the spectrum use information of the primary system. Specifically, it is possible to determine permission or rejection of start or continuation of spectrum use (radio wave transmission at the permitted frequency) on the basis of a change in the use spectrum of the primary system, a change in the spectrum use status of the primary system in which the radio wave usage is not steady (for example, a ship radar of CBRS in the United States), and the like. If the start or continuation is permitted, the communication device 110 may start or continue the spectrum use (radio wave transmission at the permitted spectrum).

After receiving the spectrum use notification, the communication control device 130 may command reconfiguration of the communication parameters to the communication device 110. Typically, in a response of the communication control device 130 to the spectrum use notification, reconfiguration of the communication parameters can be commanded. For example, information regarding recommended communication parameters (hereinafter, recommended communication parameter information) can be provided. The communication device 110 to which the recommended communication parameter information has been provided desirably performs the spectrum grant procedure described in <2.4> again using the recommended communication parameter information.

<2.5 Supplement of Various Procedures>

The procedures described above do not necessarily need to be implemented individually, as described below. For example, by substituting a third procedure including two different procedures, the two different procedures may be implemented. Specifically, for example, the registration request and the available spectrum information query request may be integrally notified. Furthermore, for example, the spectrum grant procedure and the spectrum use notification may be integrally performed. As a matter of course, it is not limited to these combinations, and three or more procedures may be performed integrally. Furthermore, as described above, one procedure may be separately performed a plurality of times.

Furthermore, the expression "to acquire" or an expression equivalent thereto in the present disclosure does not necessarily mean to acquire according to the procedure described in the present disclosure. For example, although it is described that the position information of the communication device 110 is used in the available spectrum evaluation processing, it means that the information acquired in the registration procedure does not necessarily need to be used, and in a case where the position information is included in an available spectrum query procedure request, the position information may be used. In other words, the procedure for acquisition described in the present disclosure is an example, and acquisition by other procedures is also permitted within the scope of the present disclosure and within the scope of technical feasibility.

Furthermore, the information described to be included in a response from the communication control device 130 to the communication device 110 may be actively notified from the communication control device 130 by a push method if possible. As a specific example, the available spectrum information, the recommended communication parameter information, a radio wave transmission continuation rejection notification, and the like may be notified by the push method.

<2.6 Various Procedures for Terminal>

So far, the description has been made mainly assuming the processing in the communication device 110A. However, in some embodiments, not only the communication device 110A but also the terminal 120 and the communication device 110B can operate under management of the communication control device 130. That is, a scenario in which the communication parameter is determined by the communication control device 130 is assumed. Even in such a case, basically, each procedure described in <2.1> to <2.4> can be used. However, unlike the communication device 110A, the terminal 120 and the communication device 110B need to use the spectrum managed by the communication control device 130 for the backhaul link, and cannot perform radio wave transmission without permission. Therefore, it is desirable to start backhaul communication for the purpose of accessing the communication control device 130 only after detecting a radio wave or an authorization signal transmitted by the communication device 110A (communication device 110 capable of providing wireless communication service or master communication device 110 of master-slave type).

On the other hand, under the management of the communication control device 130, there may be cases where, also in the terminal or the communication device 110B, an allowable communication parameter is set for the purpose of protecting the primary system. However, the communication control device 130 cannot know the position information and the like of these devices in advance. Furthermore, these devices are also likely to have mobility. That is, the position information is dynamically updated. Depending on the laws, in a case where the position information changes by a certain amount or more, re-registration to the communication control device 130 may be required in some cases.

In consideration of such various use forms, operation forms, and the like of the terminal 120 and the communication device 110, in the operation form of the TVWS (Non-Patent Document 5) defined by the Office of Communications (Ofcom), the following two types of communication parameters are defined.

Generic operational parameters
Specific operational parameters

The generic operational parameters are communication parameters defined as "parameters that can be used by any slave WSD located within the coverage area of a predetermined master WSD (corresponding to the communication device 110)" in Non-Patent Document 5. A feature is that it is calculated by the WSDB without using the position information of the slave WSD.

The generic operational parameters can be provided by unicast or broadcast from the communication device 110 that is already permitted to perform radio wave transmission from the communication control device 130. For example, a broadcast signal represented by a contact verification signal (CVS) specified in Part 15 Subpart H of the FCC rule in the United States can be used. Alternatively, it may be provided by a broadcast signal specific to a wireless interface. Thus, the terminal 120 and the communication device 110B can be handled as the communication parameters used for radio wave transmission for the purpose of accessing the communication control device 130.

The specific operational parameters are communication parameters defined as "parameters usable by a specific slave white space device (WSD)" in Non-Patent Document 5. In other words, they are communication parameters calculated using the device parameter of the slave WSD corresponding to the terminal 120. A feature is that it is calculated by the white space database (WSDB) using the position information of the slave WSD.

<2.7 Procedure Occurring Between Communication Control Devices>

<2.7.1 Information Exchange>

The communication control device 130 can exchange management information with another communication control device 130. At least the following information is desirably exchanged.

Information related to communication device 110
Area information
Protection target system information The information related to the communication device 110 includes at least the registration information and the communication parameter information of the communication device 110 operating under permission of the communication control device 130. The registration information of the communication device 110 having no permitted communication parameter may be included.

The registration information of the communication device 110 is typically a device parameter of the communication control device 130 registered in the communication device 110 in the above-described registration procedure. Not all of the registered information is necessarily exchanged. For example, information that may correspond to personal information does not need to be exchanged. Furthermore, when the registration information of the communication device 110 is exchanged, the registration information may be encrypted and exchanged, or the information may be exchanged after the content of the registration information is made ambiguous. For example, information converted into a binary value or information signed using an electronic signature mechanism may be exchanged.

The communication parameter information of the communication device 110 is typically information related to the communication parameters currently used by the communication device 110. At least information indicating the use spectrum and the transmission power is desirably included. Other communication parameters may be included.

The area information is typically information indicating a predetermined geographical region. This information can include region information of various attributes in various modes.

For example, as in a PAL protection area (PPA) disclosed in Non-Patent Document 3 (WINNF-TS-0112), protection zone information of the communication device 110 serving as a high priority secondary system may be included in the area information. The area information in this case can be expressed by, for example, a set of three or more coordinates indicating the geographical position. Furthermore, for example, in a case where a plurality of communication control devices 130 can refer to a common external database, the area information is expressed by a unique ID, and the actual geographical region can be referred to from the external database using the ID.

Furthermore, for example, information indicating the coverage of the communication device 110 may be included. The area information in this case can also be expressed by, for example, a set of three or more coordinates indicating the geographical position. Further, for example, assuming that the coverage is a circle centered on the geographical position of the communication device 110, the coverage can also be expressed by information indicating the size of the radius. Furthermore, for example, in a case where a plurality of communication control devices 130 can refer to the common external database that records area information, the information indicating the coverage is expressed by a unique ID, and the actual coverage can be referred to from the external database using the ID.

Furthermore, as another aspect, information related to an area section determined in advance by an administration or the like can also be included. Specifically, for example, it is possible to indicate a certain region by indicating an address. Furthermore, for example, a license area or the like can be similarly expressed.

Furthermore, as still another aspect, the area information does not necessarily express a planar area, and may express a three-dimensional space. For example, it may be expressed using a spatial coordinate system. Furthermore, for example, information indicating a predetermined closed space such as a floor number, a floor, and a room number of a building may be used.

The protection target system information is, for example, information of a wireless system treated as a protection target, such as the aforementioned existing layer (incumbent tier). Examples of the situation in which this information needs to be exchanged include a situation in which cross-border coordination is required. It is well conceivable that different objects to be protected exist in the same band between neighboring countries or regions. In such a case, the protection target system information can be exchanged between different communication control devices 130 in different countries or regions to which the communication control devices belong as necessary.

As another aspect, the protection target system information may include information of a secondary licensee and information of the wireless system operated by the secondary licensee. The secondary licensee is specifically a lessee of the license, and for example, it is assumed that the secondary licensee borrows PAL from the holder and operates the wireless system owned by itself. In a case where the communication control device 130 performs the rent management independently, information of the secondary licensee and information of the wireless system operated by the secondary licensee can be exchanged with another communication control device for the purpose of protection.

These pieces of information can be exchanged between the communication control devices 130 regardless of the decision-making topology applied to the communication control device 130.

Furthermore, these pieces of information can be exchanged in various manners. An example thereof will be described below.

ID designation method
Period designation method
Region designation method
Dump method The ID designation method is a method of acquiring information corresponding to an ID given in advance to specify information managed by the communication control device 130. For example, it is assumed that the first communication control device 130 manages the communication device 110 with ID: AAA. At this time, the second communication control device 130 designates the ID: AAA to the first communication control device 130 and makes an information acquisition request. After receiving the request, the first communication control device 130 searches for information of ID: AAA, and notifies of information regarding the communication device 110 of ID: AAA, for example, registration information communication parameter information, and the like in response.

The period designation method is a method in which information satisfying a predetermined condition can be exchanged in a designated specific period.

Examples of the predetermined condition include the presence or absence of information update. For example, in a case where acquisition of information regarding the communication device 110 in the specific period is designated by a request, the registration information of the communication device 110 newly registered within the specific period can be notified in response. Furthermore, the registration information or the information of communication parameters of the communication device 110 whose communication parameter has been changed within the specific period can also be notified in response.

Examples of the predetermined condition include whether the predetermined condition is recorded by the communication control device 130. For example, in a case where acquisition of information regarding the communication device 110 in the specific period is designated in the request, the registration information or the information of the communication parameters recorded by the communication control device 130 in the period can be notified in response. In a case where the information is updated in the period, the latest information in the period can be notified. Alternatively, an update history may be notified for each piece of information.

In the region designation method, a specific region is designated, and information of the communication device 110 belonging to the region is exchanged. For example, in a case where acquisition of information regarding the communication device 110 in the specific region is designated by a request, the registration information or the information of the communication parameters of the communication device 110 installed in the region can be notified by a response.

The dump method is a method of providing all information recorded by the communication control device 130. At least information and area information related to the communication device 110 are desirably provided by the dump method.

The above description of the information exchange between the communication control devices 130 is based on a pull method. That is, it is a form in which information corresponding to the parameter designated in the request is responded, and can be implemented by the HTTP GET method as an example. However, it is not limited to the pull method, and information may be actively provided to another communication control device 130 by the push method. As an example, the push manner can be implemented by the HTTP POST method.

<2.7.2 Command or Request Procedure>

The communication control device 130 may execute a command or a request with each other. Specifically, as an example, there is reconfiguration of communication parameters of the communication device 110. For example, in a case where it is determined that the first communication device 110 managed by the first communication control device 130 is greatly interfered with by the second communication device 110 managed by the second communication control device 130, the first communication control device 130 may request the second communication control device 130 to change the communication parameter of the second communication device 110.

As another example, there is reconfiguration of the area information. For example, in a case where calculation of coverage information and protection zone information regarding the second communication control device 130 managed by the second communication device 110 is incomplete, the first communication control device 130 may request the second communication control device 130 to reconfigure the area information. Besides this, the area information reconfiguration request may be made for various reasons.

<2.8 Information Transmission Means>

A notification (signaling) between entities described above can be implemented via various media. E-UTRA or 5G NR will be described as an example. As a matter of course, it is not limited thereto when implementing.

<2.8.2 Signaling Between Communication Control Device 130 and Communication Device 110>

The notification from the communication device 110 to the communication control device 130 may be performed, for example, in an application layer. For example, the Hyper Text Transfer Protocol (HTTP) may be used. Signaling can be performed by describing required parameters in the message body of the HTTP according to a predetermined manner. Moreover, in the case of using the HTTP, notification from the communication control device 130 to the communication device 110 is also performed according to the HTTP response mechanism.

<2.8.3 Signaling Between Communication Device 110 and Terminal 120>

The notification from the communication device 110 to the terminal 120 may be performed using, for example, at least one of radio resource control (RRC) signaling, system information (SI), or downlink control information (DCI). Furthermore, examples of the downlink physical channel include a physical downlink control channel (PDCCH), a physical downlink shared channel (PDSCH), a physical broadcast channel (PBCH), an NR-PDCCH, an NR-PDSCH, an NR-PBCH, and the like, but the downlink physical channel may be implemented using at least one of these.

The notification from the terminal 120 to the communication device 110 may be performed using, for example, radio resource control (RRC) signaling or uplink control information (UCI). Furthermore, it may be implemented by using an uplink physical channel (physical uplink control channel (PUCCH), physical uplink shared channel (PUSCH), physical random access channel (PRACH)).

The signaling is not limited to the physical layer signaling described above, and the signaling may be performed at a higher layer. For example, at the time of implementation at the application layer, signaling may be implemented by describing a required parameter in a message body of the HTTP according to a predetermined manner.

<2.8.4 Signaling Between Terminals 120>

Figure 8:
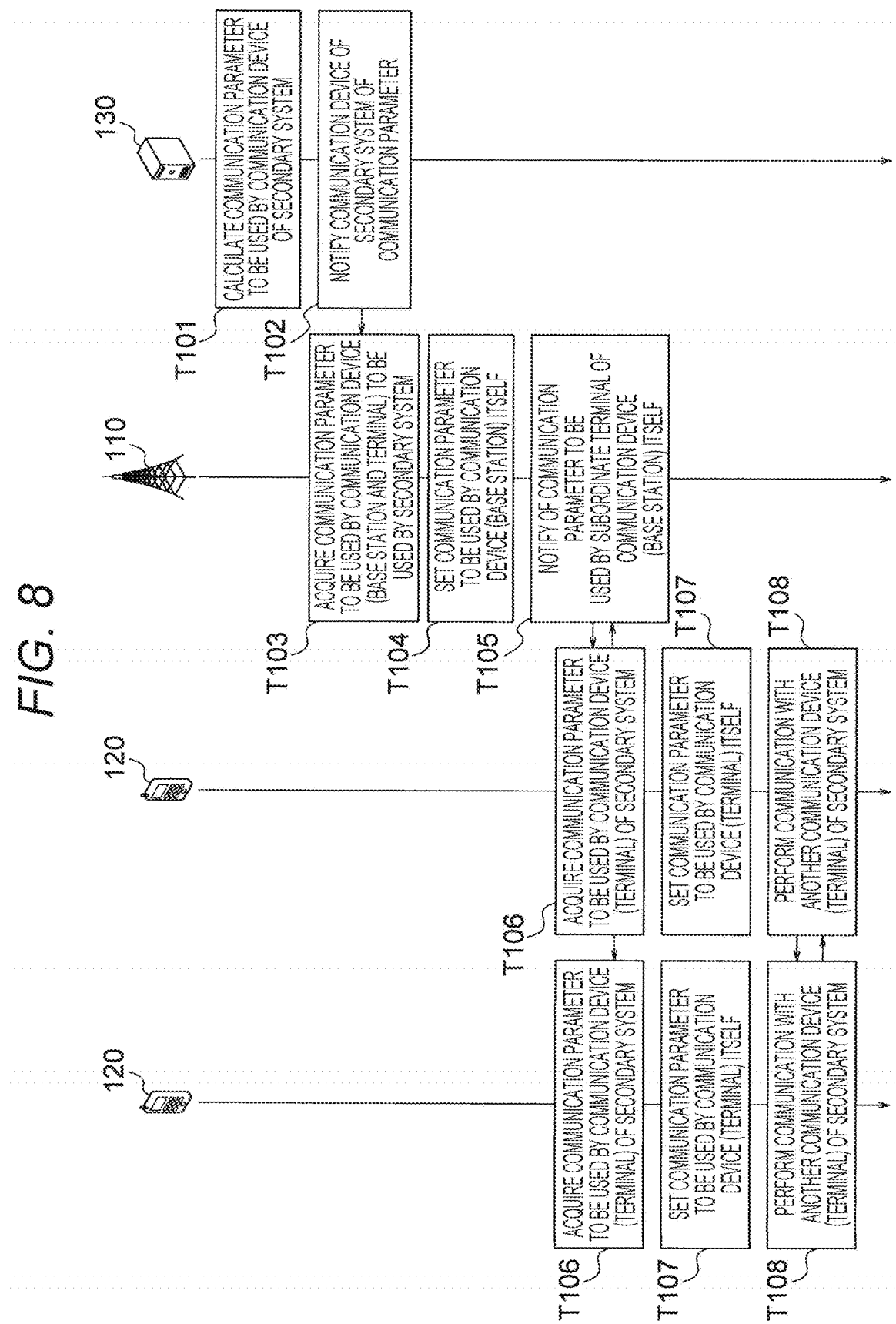
FIG. 8 is a diagram describing a flow of signaling between terminals.

FIG. 8 illustrates an example of a flow of signaling in a case where device-to-device (D2D) or vehicle-to-everything (V2X), which is communication between the terminals 120, is assumed as communication of the secondary system. The D2D or V2X which is communication between the terminals 120 may be performed using a physical sidelink channel (physical sidelink control channel (PSCCH), physical sidelink shared channel (PSSCH), physical sidelink broadcast channel (PSBCH)). The communication control device 130 calculates a communication parameter to be used by the secondary system (T101) and notifies the communication device 110 of the secondary system of the calculated communication parameter (T102). A value of the communication parameter may be determined and notified, or a condition indicating a range or the like of the communication parameter may be determined and notified. The communication device 110 acquires a communication parameter to be used by the secondary system (T103), and sets the communication parameter to be used by the communication device 110 itself (T104). Then, the terminal 120 is notified of a communication parameter to be used by the terminal 120 subordinate to the communication device 110 (T105). Each terminal 120 subordinate to the communication device 110 acquires (T106) and sets (T107) the communication parameter to be used by the terminal 120. Then, communication with another terminal 120 of the secondary system is performed (T108).

The communication parameter in a case where the target frequency channel for spectrum sharing is used in the sidelink (direct communication between the terminals 120) may be notified, acquired, or set in a form associated with a resource pool for sidelink in the target frequency channel. The resource pool is a radio resource for a sidelink set by a specific frequency resource or time resource. Examples of the frequency resource include a resource block, a component carrier, and the like. The time resource includes, for example, a radio frame, a subframe, a slot, a mini-slot, and the like. In a case where the resource pool is set in a frequency channel to be subjected to spectrum sharing, the resource pool is set in the terminal 120 by the communication device 110 on the basis of at least one of the RRC signaling, the system information, or the downlink control information. Then, the communication parameters to be applied in the resource pool and the sidelink are also set in the terminal 120 by the communication device 110 on the basis of at least one of the RRC signaling, the system information, or the downlink control information from the communication device 110 to the terminal 120. The notification of setting of the resource pool and the notification of the communication parameter to be used in the sidelink may be performed simultaneously or individually.

<<3. Procedure in Case of Performing Beamforming>>

Moreover, in the dynamic spectrum sharing of the present embodiment, it is assumed that the communication device 110 has a function for performing beamforming, and when the shared frequency band is used, a procedure for performing beamforming is performed. With this procedure, it is possible to eliminate a situation in which the transmission of the radio wave is stopped when the shape of the beam in the beamforming, that is, the beam pattern is changed.

Note that the type of beamforming is not limited, and digital beamforming or analog beamforming may be used. The communication device 110 may be capable of performing both the digital beamforming and the analog beamforming.

In the present embodiment, the communication control device 130 is also assumed to be a frequency management (which can also be described as supervising) database server such as SAS. Then, a procedure for performing the beamforming is performed between the communication device 110 and the communication control device 130. Note that not all of the communication control device 130 in the system need to be frequency management database servers. Furthermore, the procedure may be performed as one procedure in the spectrum grant procedure, the available spectrum information query procedure, and the like described above. Alternatively, it may be performed independently of these procedures. Furthermore, as described above, the communication related to the procedure for performing the beamforming may be performed by wire or wirelessly. Furthermore, the communication may be directly performed between both devices, or may be indirectly performed via an intermediate device such as a network manager.

Figure 9:
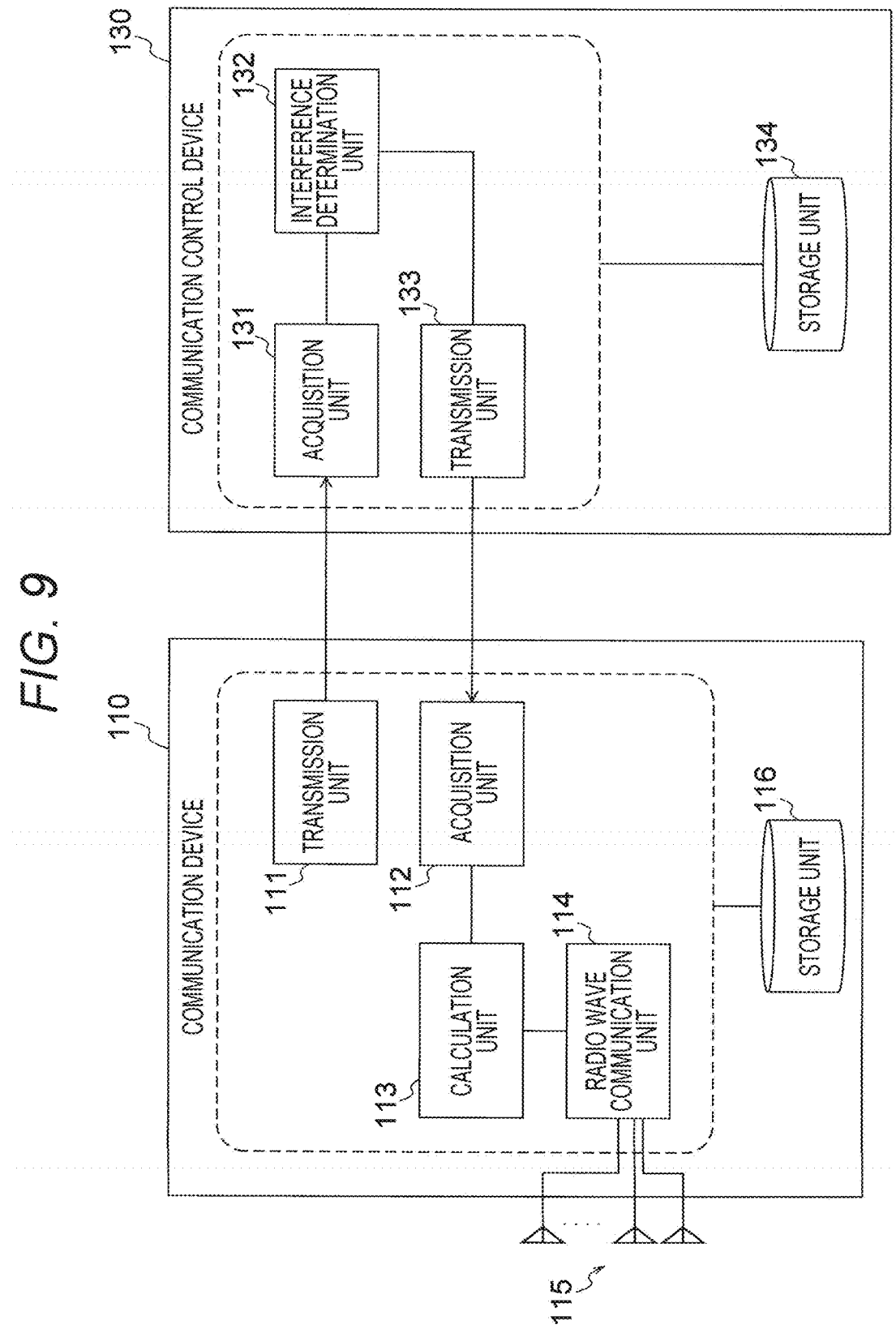
FIG. 9 is a diagram illustrating examples of internal configurations of a communication device and a communication control device for performing a procedure for performing beamforming.

Configurations of the communication control device 130 and the communication device 110 for performing the procedure for performing the beamforming will be described. FIG. 9 is a diagram illustrating examples of internal configurations of the communication device and the communication control device for performing the procedure for performing the beamforming. The communication device 110 illustrated in FIG. 9 includes a transmission unit 111, an acquisition unit 112, a calculation unit 113, a radio wave communication unit 114, an antenna 115, and a storage unit 116. Furthermore, the communication control device 130 illustrated in FIG. 9 includes an acquisition unit 131, an interference determination unit 132, a transmission unit 133, and a storage unit 134.

Note that components in FIG. 9 are for performing the procedure for performing the beamforming, and the communication device 110 and the communication control device 130 may have components or functions that are not illustrated or described. Further, the description of the present disclosure does not exclude components or functions not illustrated or described. Furthermore, when the components in FIG. 9 are implemented by software, a circuit, or the like, the components may be implemented by being subdivided, or may be implemented collectively.

Figure 10:
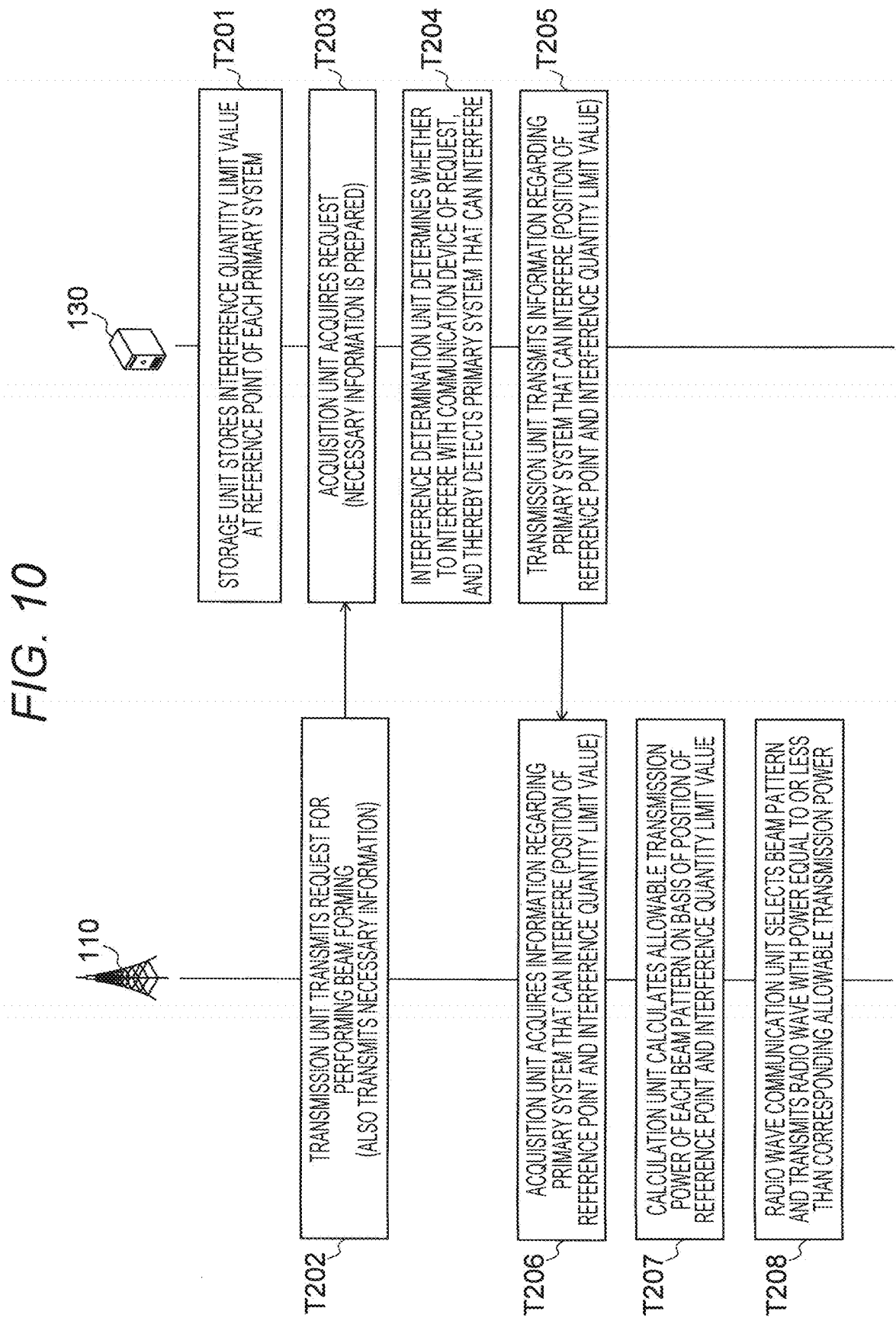
FIG. 10 is a diagram describing a procedure flow in a case where the beamforming is performed.

Processing of the components of the communication device 110 and the communication control device 130 will be described together with a procedure flow in a case where the beamforming is performed. FIG. 10 is a diagram describing a procedure flow in a case where the beamforming is performed. First, the storage unit 134 of the communication control device 130 stores the interference quantity limit value at each reference point in the protection zone of each primary system under the management of itself (T201).

It is assumed that the protection zone of the primary system is predetermined. The protection zone may be the same as the coverage of the communication device 110 belonging to the primary system, or may be wider than the coverage by providing a margin. Note that there may be cases where the primary system is only a base station that receives satellite radio waves. In that case, the base station serves as a reference point. Note that protecting only a specific reference point is referred to as point protection and may be distinguished from area protection for protecting a region of a certain range, but in the present disclosure, the point protection is described as a case where a protection zone is narrow and is included in the area protection.

The reference point of the primary system indicates a location where the interference quantity is calculated when calculating the interference quantity from another wireless system. The reference point may be determined in advance, or may be determined by the communication control device 130 on the basis of the protection zone. The interference quantity limit value indicates the maximum allowable interference quantity at the reference point. The interference quantity limit value may be provided from the primary system, or may be determined by the communication control device 130 on the basis of a default value in the laws in the region related to the protection zone, or the like. For example, the interference quantity limit value may be the above-described allowable interference power. Furthermore, the interference quantity limit value may be further adjusted in consideration of a protection ratio, a signal power-to-interference power ratio, a surrounding environment, importance of the primary system, a margin, and the like.

Figure 11:
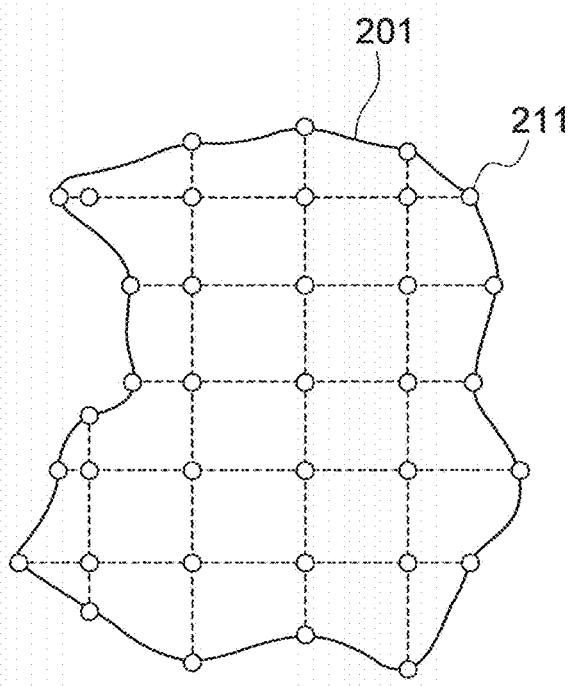
FIG. 11 is a diagram describing reference points.

FIG. 11 is a diagram for describing reference points. A region surrounded by a solid line indicates a protection zone 201. Note that in the example of FIG. 11, it is assumed that the coverage of the primary system is the protection zone 201, and the coverage is not a circle centered on the position of the communication device 110 but has a shape distorted by actual topography or the like. A white circle provided on an edge of the protection zone 201 and inside the protection zone indicates a reference point 211.

For example, the reference point in the protection zone may be, for example, a position where grid lines provided in advance on a map indicating the protection zone intersect. Further, a position where a grid line and the edge of the protection zone intersect may be used as the reference point. Furthermore, the center of each grid (region surrounded by grid lines) may be set as the reference point. The position, interval, and the like of the grid line may also be determined by the communication control device 130.

The description returns to the procedure flow in the case where the beamforming is performed. After the acquired or calculated interference quantity limit value is stored in the storage unit 134 in this manner, as illustrated in FIG. 10, the transmission unit 111 of the communication device 110 transmits a request for performing the beamforming (T202), and the acquisition unit 131 of the communication control device 130 receives the request (T203). The interference determination unit 132 of the communication control device 130 determines whether each primary system under the management of the communication control device 130 and the communication device 110 that has transmitted the request can interfere with each other, and detects a primary system that can interfere, in other words, a primary system that has a possibility to interfere (T204).

Note that even in a case where the frequency band allocated to the communication device 110 that has transmitted the request does not overlap the frequency band (first frequency band) allocated to the primary system, the frequency band (second frequency band) of the radio wave actually transmitted by the communication device 110 exceeds the frequency band allocated to the communication device 110 due to out-of-band radiation or the like, and may overlap a part of the frequency band (first frequency band) allocated to the primary system. Therefore, even in such a case, it is preferable to determine whether there is a possibility that the communication device 110 and the primary system interfere with each other due to out-of-band radiation.

The primary system that can interfere is typically determined on the basis of the protection zone of the primary system and the coverage of the communication device 110. In a case where the protection zone and the coverage overlap, it may be considered that interference can occur. Note that even in a case where the coverage does not overlap the protection zone, it may be considered that interference may occur in a case where the distance does not exceed a predetermined threshold. In this manner, if there is a possibility of interference although it may not actually interfere, it may be regarded as interference. This is because, in a case where the primary system that does not actually interfere is detected, the number of times of subsequent processing of the communication device 110 increases but the result of the processing does not change.

Information necessary for the communication control device 130 to grasp the coverage of the communication device 110 can be transmitted together with the request for performing the beamforming. Note that in a case where the communication control device 130 has already received the information at the time of the above-described registration procedure or the like, it is not necessary to transmit the information again. The communication device 110 may transmit information indicating its own coverage itself. Alternatively, its own position information and antenna information may be transmitted to the communication control device 130, and the communication control device 130 may calculate the coverage of the communication device 110.

As described above, the communication control device 130 may simply regard a circle centered on the position of the communication device 110 as the coverage of the communication device 110. Alternatively, for example, more accurate coverage may be calculated on the basis of a model, a gain, the number of elements, a dimension (2D or 3D), an element interval, an installation elevation angle, an installation azimuth angle, an installation height, and the like of the antenna 115 included in the antenna information. Furthermore, in a case where the orientation of the antenna 115 can be dynamically changed, the coverage of the communication device 110 may be calculated more accurately on the basis of the movable range of the elevation angle and the azimuth angle included in the antenna information.

Note that the antenna information can also include information regarding the shape of the formable beam, that is, the beam pattern, but in a procedure for performing the beamforming, it is not necessary to transmit the information to the communication control device 130. This is because, in the example of FIG. 10, in order to reduce the processing load of the communication control device 130, the communication control device 130 does not consider the beam pattern of the communication device 110, and the communication device 110 determines the beam pattern and the like to be used.

Note that the position information transmitted and received in the procedure in the case of performing the beamforming is only required to be information that can specify the position, similar to the position information used in the registration procedure and the like. For example, the communication device 110 and the communication control device 130 may share a map file indicating a grid, and an identifier of the grid on the map may be notified as the position information.

The transmission unit 133 of the communication control device 130 transmits information regarding the primary system that can interfere (T205), and the acquisition unit 112 of the communication device 110 receives the information (T206). The information includes at least the reference point of the primary system or the interference quantity limit value thereof.

Note that in a case where interference is suffered by a plurality of radio waves at the reference point, the interference quantity limit value indicates the limit value of the sum of interference quantities of the respective radio waves. Therefore, in a case where there is a plurality of communication devices 110 as interferers, it is necessary to distribute the interference quantity limit value for each interferer. That is, the transmission unit 133 of the communication control device 130 transmits the individual interference quantity limit value distributed to the communication device 110.

The method of determining distribution of the interference quantity limit value may be appropriately determined as long as the following expression is satisfied. The interference quantity limit value may be equally divided by interferers, or may be distributed with a weight for each interferer. The weight can be determined according to the distance between the interferer and the reference point, the type of the interferer, the scale of the secondary system, and the like.

[Expression 3]

$$I_{Threshold,k} = \sum_{j=1}^{J} I_{Threshold,k,j} \quad (3)$$

$I_{Threshold,k}$ represents an interference quantity limit value at a k-th (k is an integer of one or more) interference calculation reference point. $I_{Threshold,k,j}$ represents the interference quantity limit value at a j-th (j is an integer of one or more) interferer at the k-th interference calculation reference point. J (J is an integer of j or more) represents the total number of interferers.

The calculation unit 113 of the communication device 110 calculates the allowable transmission power of each beam pattern that can be implemented by the beamforming of the communication device 110 on the basis of the position of the reference point and the interference quantity limit value (T207). Details of the calculation will be described later. The allowable transmission power means power in which the interference quantity of the radio wave at the reference point is equal to or less than the interference quantity limit value. Then, the radio wave communication unit 114 selects a beam pattern to be used, and transmits a radio wave with power equal to or less than the allowable transmission power corresponding to the selected beam pattern (T208).

The selection of the beam pattern is only required to be performed appropriately. For example, the beam pattern may be selected on the basis of the position of the terminal 120 that uses the wireless communication service provided by the communication device 110. For example, the beam pattern may be selected on the basis of the strength of the radio wave, a signal-noise ratio (SN ratio), or the like at the position of the terminal 120.

The transmission power of the radio wave may be the same as the allowable transmission power, or a margin may be further provided. In this way, the communication device 110 can recognize the transmission power that does not interfere with the primary system for each beam pattern and perform the beamforming. That is, even if the beam pattern is freely switched, the radio wave is transmitted with lower power than the allowable transmission power of the switched beam pattern, and thus all the reference points can be protected.

Figure 12:
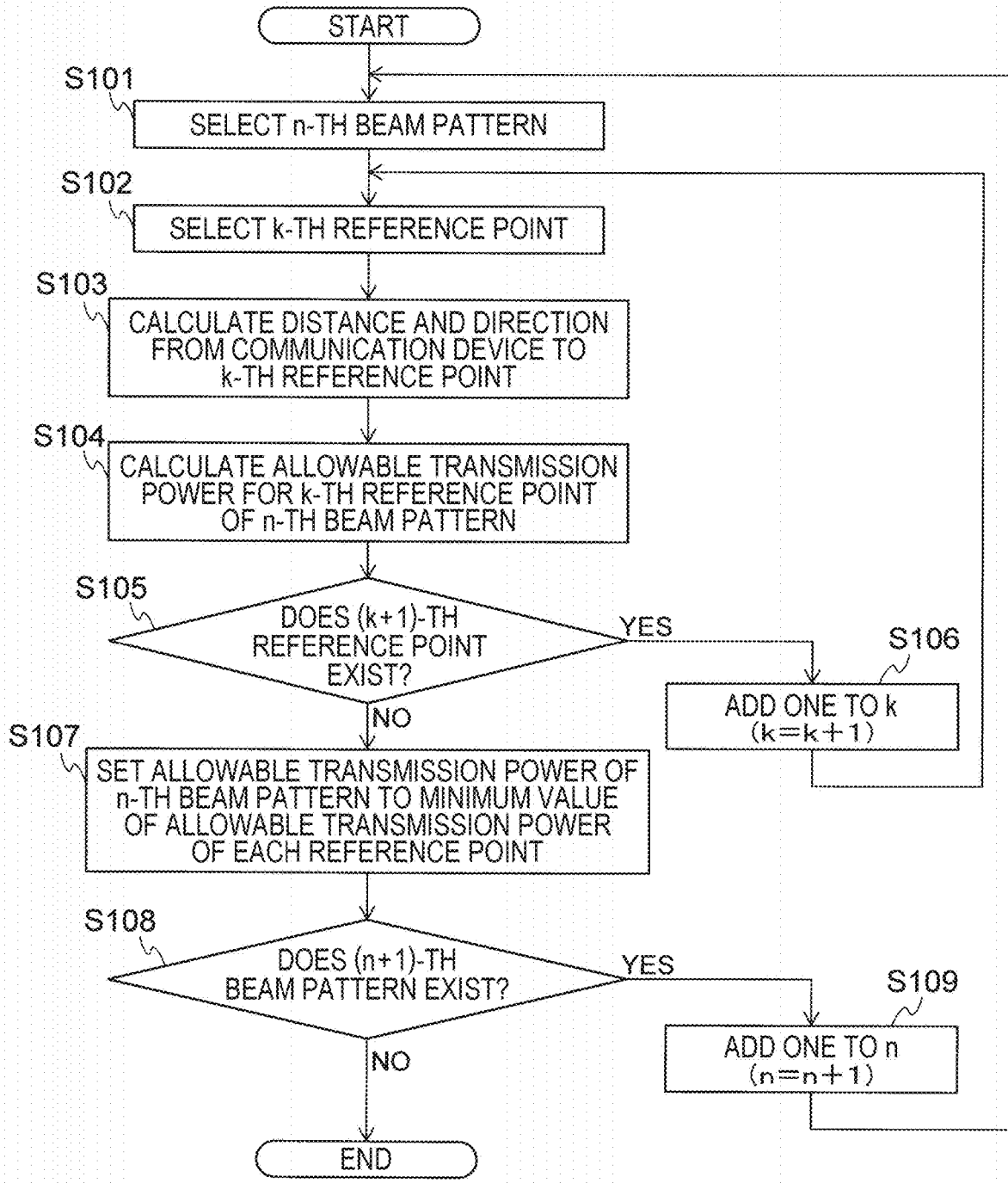
FIG. 12 is a flowchart of calculation processing of allowable transmission power.

Details of the calculation of the transmission power will be described. FIG. 12 is a flowchart of processing of calculating the allowable transmission power. This flow is performed in the calculation unit 113. Note that it is assumed that the beam pattern that can be performed by the beamforming is stored in the storage unit 116 in advance.

The calculation unit 113 selects an n-th (n is an integer of one or more, and an initial value of n is one) beam pattern (S101). Furthermore, the calculation unit 113 selects a k-th (an initial value is one) reference point (S102), and calculates a distance and a direction to the k-th reference point on the basis of the positions of the communication device 110 and the reference point (S103).

Figure 13:
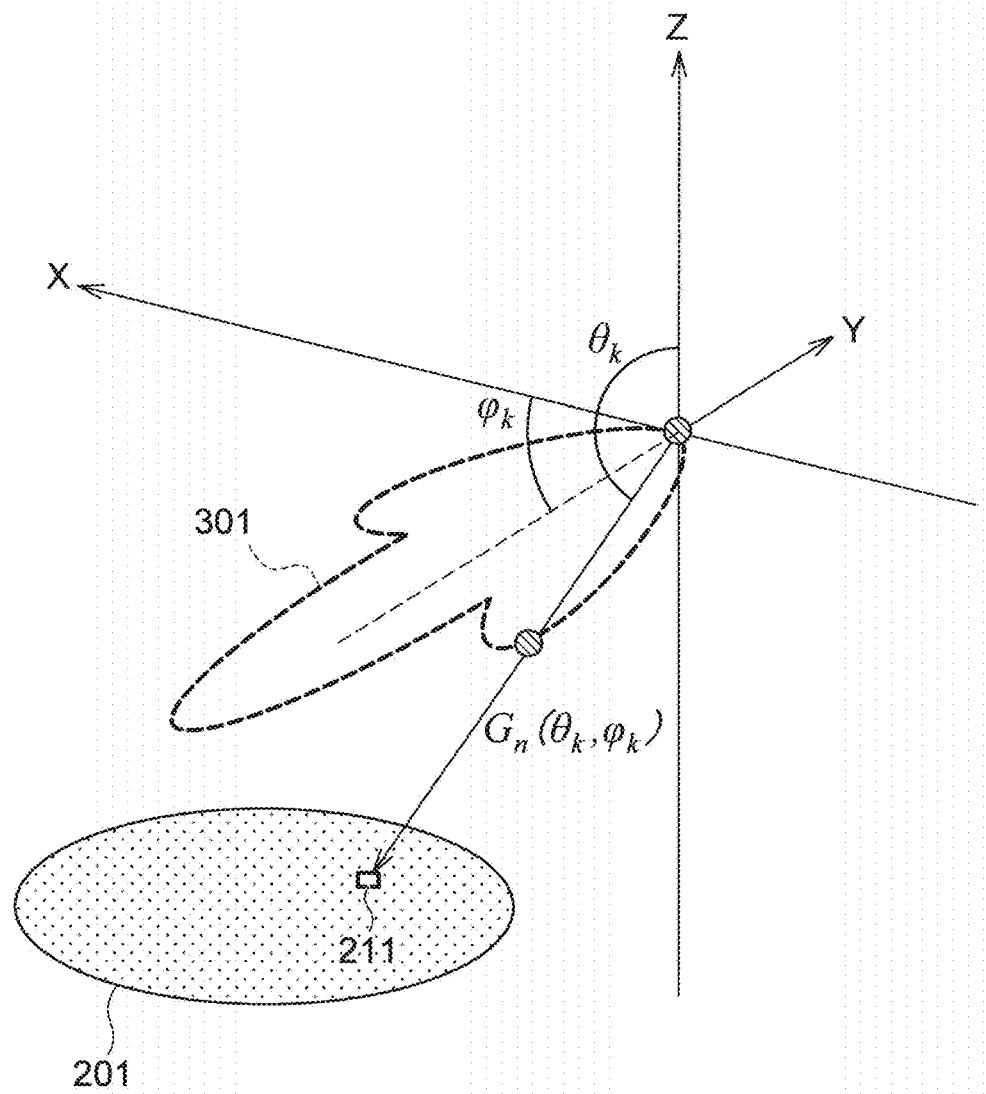
FIG. 13 is a diagram describing calculation of the allowable transmission power of a beam pattern.

Next, the allowable transmission power for the k-th reference point of the n-th beam pattern is calculated (S104). FIG. 13 is a diagram for describing calculation of the allowable transmission power of the beam pattern. In FIG. 13, a three-dimensional space by XYZ coordinate axes is illustrated. It is assumed that the antenna 115 is at the origin of the three-dimensional space (the intersection of the respective coordinate axes). A radio wave having a k-th beam pattern is radiated from the antenna 115, and is indicated by a dotted line as a beam pattern 301. Furthermore, the selected k-th reference point is illustrated as the reference point 211.

An arrow from the origin where antenna 115 exists toward the reference point 211 indicates a direction toward the reference point. The direction is represented by an angle $\theta_k$[rad] on the vertical plane and an angle $\varphi_k$[rad] on the horizontal plane. Note that a dotted line forming the angle $\varphi_k$ with the X axis indicates a component of the horizontal plane of the arrow. That is, these angles $\theta_k$ and $\varphi_k$ are calculated as the direction to the k-th reference point.

In a case where the interference quantity limit value is represented by power [dBm], a calculation expression of the allowable transmission power for the k-th reference point of the n-th beam pattern is represented by the following expression.

[Expression 4]

$$P_{n,k} \leq I_{Threshold,k} + L(d_k) - G_n(\theta_k, \Phi_k) - M \tag{4}$$

$P_{n,k}$ represents the allowable transmission power for the k-th reference point of the n-th beam pattern. $L(d_k)$ indicates a value [dB] of the propagation loss in a case where the distance between the communication device 110 and the reference point is $d_k$. $G_n(\theta, \Phi)$ represents the value of the beam gain at the angles $\theta_k$ and $\varphi_k$ of the n-th beam pattern. As the calculation functions of the propagation transport loss and the beam gain, it is only required to use known functions. M is a margin. As described above, the margin may be considered when the allowable transmission power is calculated, or the transmission power may be made lower than the allowable transmission power by being considered when the radio wave is transmitted. That is, the margin M may be omitted, in other words, may be zero.

In this way, the allowable transmission power for the k-th reference point is calculated, and the calculation unit 113 checks whether the (k+1)-th reference point exists. In a case where the (k+1)-th reference point exists (YES in S105), one is added to k (S106), and the processing returns to S102. In this way, the processing of S102 to S104 is repeated until the allowable transmission power for all the reference points of the n-th beam pattern is calculated.

In a case where the (k+1)-th reference point does not exist (NO in S108), that is, in a case where the allowable transmission power for all the reference points is calculated, the allowable transmission power of the n-th beam pattern is set to the minimum value of the allowable transmission power of each reference point (S107). The setting is expressed by the following expression.

[Expression 5]

$$P_n = \min_{1 \leq k \leq K} \{P_{n,k}\} \tag{5}$$

$P_n$ indicates the allowable transmission power of the n-th beam pattern. Note that in the above expression, the number of reference points is K.

Figure 14:
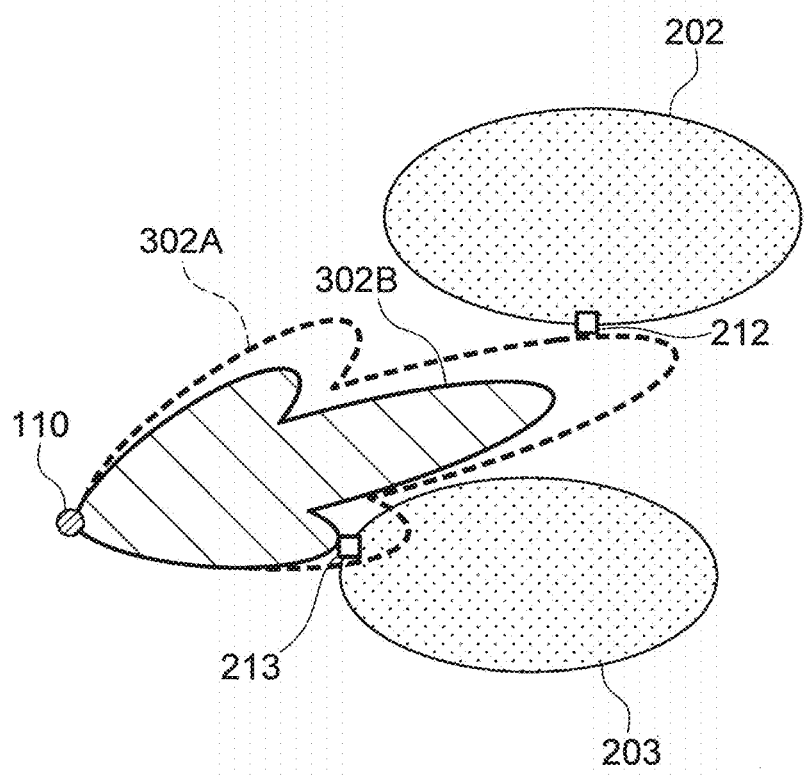
FIG. 14 is a diagram describing determination of the allowable transmission power of an n-th beam pattern.

FIG. 14 is a diagram for describing determination of the allowable transmission power of the n-th beam pattern. In the example of FIG. 14, two protection zones 202 and 203 have reference points 212 and 213, respectively. A beam pattern 302A at the allowable transmission power $P_{n,1}$ with respect to the reference point 212 is indicated by a dotted line. A beam pattern 302B at the allowable transmission power $P_{n,2}$ with respect to the reference point 213 is indicated by a solid line.

The beam pattern is reduced when the allowable transmission power is reduced. Therefore, the allowable transmission power of the beam pattern 302B is smaller. Furthermore, as illustrated in FIG. 14, the beam pattern having the smaller allowable transmission power does not reach the reference point related to the beam pattern having the larger allowable transmission power. Therefore, if the minimum value of the allowable transmission power is selected as in Expression (4), the interference quantity limit value is not exceeded at all the reference points.

In this way, the allowable transmission power of the n-th beam pattern is calculated, and the calculation unit 113 checks whether a (n+1)-th beam pattern exists. In a case where the (n+1)-th beam pattern exists (YES in S108), one is added to n (S109), and the processing returns to the processing of S101. In this way, the processing of S101 to S107 is repeated until the allowable transmission power of all the beam patterns is calculated. In a case where the (n+1)-th beam pattern does not exist (YES in S108), the allowable transmission power of all the beam patterns is calculated, and the flow ends.

Note that in the above example, the allowable transmission power is calculated without considering gain on the reception antenna side. In a case where the gain on the reception antenna side is considered, the following expression may be used instead of the above Expression (4).

[Expression 6]

$$P_{n,k_{Max}} = I_{Threshold,k} + L(d_k) - G_{n,T_x}(\theta_{k,T_x}, \Phi_{k,T_x}) - G_{R_x}(\theta_{k,R_x}, \Phi_{k,R_x}) - M \tag{6}$$

$P_{n,k_{Max}}$ represents the maximum value of the allowable transmission power for the k-th reference point of the n-th beam pattern. $G_{n,T_x}(\theta_{k,T_x}, \Phi_{k,T_x})$ represents the value of beam gain on the transmission side at angles $\theta_{k,T_x}$ and $\Phi_{k,T_x}$ from the transmission side of the n-th beam pattern. $G_{R_x}(\theta_{k,R_x}, \Phi_{k,R_x})$ represents the value of beam gain on the reception side at angles $\theta_{k,R_x}$ and $\Phi_{k,R_x}$ from the reception side of the n-th beam pattern.

Furthermore, the gains of the transmission antenna and the reception antenna are not necessarily provided as beam patterns, and the gain may be provided for each range of spatial directions. Like an omni antenna, the same gain may be applied in all directions. The gain of the main lobe of the beam may be set in all spatial directions of the beam or in a range in a certain direction. Moreover, the gain of the main lobe of a certain beam may be set in all spatial directions of all beams or in a range in a certain direction.

Note that in the above flow, all the beam patterns are selected, and the allowable transmission power is calculated. However, a selection condition for a beam pattern may be provided, and the allowable transmission power may be calculated only for the beam pattern satisfying the selection condition. The beam pattern for which the allowable transmission power has not been calculated may be made unusable. In other words, only the beam pattern satisfying the selection condition and having the allowable transmission power calculated may be approved as the transmittable beam pattern.

It is conceivable that the selection condition is for omitting a beam pattern that is assumed not to be implemented. For example, a beam pattern in which the main lobe (the maximum peak of the beam pattern) exists in the direction of the reference point may not be selected. Furthermore, for example, beam patterns may be arranged in the order of the radiation angle of the main lobe, and a beam pattern that is not selected may be determined at regular intervals in the order.

Furthermore, instead of not calculating the allowable transmission power of the unselected beam pattern, the allowable transmission power of the unselected beam pattern may be calculated by another calculation method. For example, the allowable transmission power of the unselected beam pattern may be complemented on the basis of the allowable transmission power of the selected beam pattern. For example, a beam pattern having a difference in radiation angle from the unselected beam pattern within a predetermined value may be extracted, a weighted average weighted by an inverse number of the angle difference may be calculated using the extracted allowable transmission power, and the calculated value may be used as the allowable transmission power of the unselected beam pattern. Furthermore, for example, in a case where the procedure for performing the beamforming has been completed in another shared frequency band, the allowable transmission power of the beam pattern in the shared frequency band to be newly used may be calculated on the basis of the allowable transmission power of the beam pattern in the another shared frequency band. The interpolation method may use various methods such as weighted averaging, the Kriging method, and spline interpolation, and is not particularly limited.

Note that in the above flow, the allowable transmission power for all the reference points is calculated for each beam pattern, and then the allowable transmission power of each beam pattern is determined. Therefore, if the reference point is finely provided in the protection zone, the processing load on the calculation unit 113 increases. Accordingly, not all the reference points may be set as calculation targets, but only specific reference points may be set as calculation targets. That is, the reference points as calculation targets can be thinned out. In that case, it is preferable to perform adjustment so as to increase the margin M at the time of calculating the allowable transmission power according to the number of decimations or the like.

For example, only the reference point in a specific portion of the protection zone may be set as a calculation target. For example, it is possible to set only the reference point on the edge of the protection zone as the calculation target and not to set the reference point in the protection zone as the calculation target. Furthermore, for example, only the reference point existing on an arc or a side closer to the communication device 110 can be set as the calculation target. This is because the reference point close to the communication device 110 is estimated to have smaller allowable transmission power. Furthermore, in a case where there is a plurality of reference points in the same direction, only the reference point closest to the communication device 110 among the plurality of reference points may be set as the calculation target.

Furthermore, the calculation target can be thinned out on the basis of the beam pattern. For example, the reference point existing in a direction within the radiation angle of the main lobe can be set as the calculation target. Further, for example, the reference point existing in a direction within a predetermined angle from the radiation angle at the center of the main lobe can be set as the calculation target. Furthermore, for example, the reference point existing in a direction within a range (for example, a half-value width) in which the ratio of radiation intensity of the beam pattern to the maximum radiation intensity is equal to or more than a predetermined value can be set as the calculation target.

Further, the reference point as the calculation target may be narrowed in consideration of the topography, buildings, and the like around the protection zone. Furthermore, the reference points having close distances can be aggregated into one. The reference point as the calculation target may be determined by a predetermined law.

Figure 15:
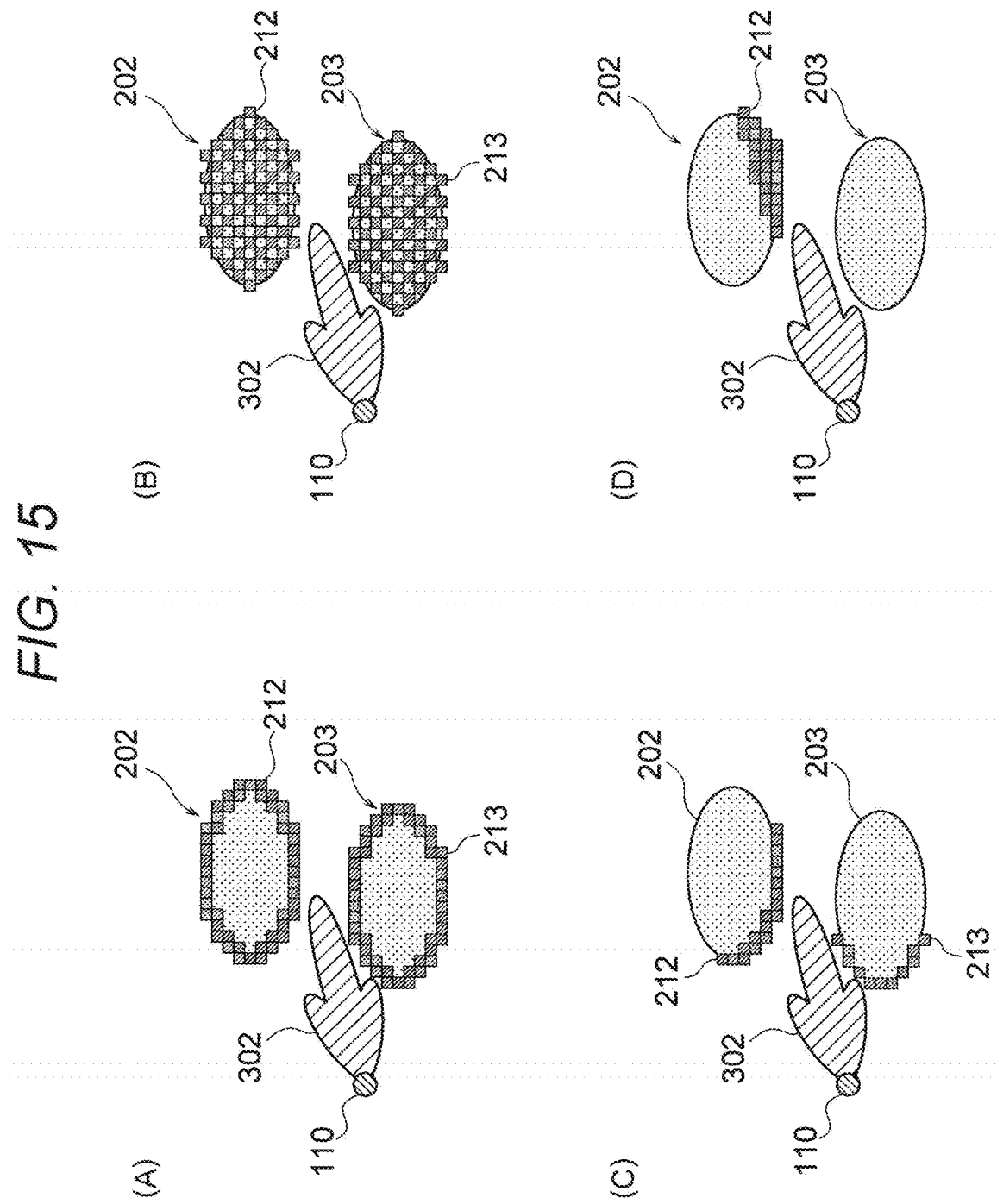
FIG. 15 is a diagram describing a method of determining reference points as calculation targets.

FIG. 15 is a diagram for describing a method of determining a reference point as a calculation target. FIG. 15(A) illustrates an example in which only reference points 212 and 213 at edges of protection zones 202 and 203 are set as calculation targets. FIG. 15(B) illustrates an example in which the reference points 212 and 213 as calculation targets are selected at regular intervals. FIG. 15(C) illustrates an example in which only the reference points 212 and 213 existing in arcs closer to the communication device 110 are set as calculation targets. FIG. 15(D) illustrates an example in which the reference points 212 existing in a direction within the radiation angle of the main lobe are set as calculation targets. A method of determining the reference point as a calculation target may be appropriately determined.

Note that in the above example, the allowable transmission power of each beam pattern is obtained so that each beam pattern can be used. In other words, even the beam pattern that can interfere with the protection zone of the primary system can be used by reducing the transmission power. However, the beam pattern that can interfere with the protection zone of the primary system may be disabled. Specifically, assuming that the beam pattern selected in the processing of S101 is transmitted with desired transmission power or maximum desired power indicated by the transmission power information, when the interference quantity of the radio wave at the reference point exceeds the interference quantity limit value, the selected beam pattern may be made unusable.

As described above, in the present embodiment, when the shared frequency band is used, a procedure for performing the beamforming is performed, and the transmission power of each beam pattern is determined by the communication device 110 so as not to violate the primary system. Thus, the beam pattern can be freely switched on the communication device 110 side, and smooth operation of the beamforming is enabled.

For example, in a case where the communication device 110 provides a wireless communication service to the terminal 120 using the beamforming, the communication device 110 can instantaneously switch the beam pattern according to the movement of the terminal 120 or the like.

FIG. 16 is a diagram illustrating an example of an internal configuration of the communication device 110 for switching a beam pattern. Compared with the internal configuration of the communication device 110 illustrated in FIG. 9, a switching determination unit 117 is newly added.

The switching determination unit 117 determines to switch the currently used beam pattern to another beam pattern. For example, when the terminal 120 moves, the strength of the radio wave received from the terminal 120, the noise ratio of the radio wave, and the like vary. In response to this, it may be determined that the terminal 120 has moved. Alternatively, whether to switch may be determined by communication with the terminal 120, for example, the number of times of packet retransmission requests, a notification message of movement from the terminal 120, or the like.

FIG. 17 is a flowchart of processing for switching the beam pattern. It is assumed that this flow is performed after the allowable transmission power of each beam pattern is already determined, and the allowable transmission power is stored in the storage unit 116.

The radio wave communication unit 114 receives a radio wave or the like from the communication device 110 (S201). The switching determination unit 117 determines whether to switch the beam pattern on the basis of the radio wave, communication by the radio wave, or the like (S202). In a case where it is determined not to switch (NO in S203), the flow ends. In a case where it is determined to switch (YES in S203), the radio wave communication unit 114 selects the beam pattern to be switched from the usable beam patterns stored in the storage unit 116 (S204), and acquires the allowable transmission power of the selected beam pattern from the storage unit 116 (S205). Then, the radio wave communication unit 114 transmits the selected beam pattern with power lower than the corresponding allowable transmission power (S206). Thus, the beam pattern is switched and the flow ends.

Since this flow is executed every time the radio wave from the communication device 110 is received, the beam pattern suitable for the terminal 120 can be continuously provided.

Note that the above-described embodiments illustrate examples for embodying the present disclosure, and the present disclosure can be implemented in various other forms. For example, various modifications, substitutions, omissions, or combinations thereof can be made without departing from the gist of the present disclosure. Such modifications, substitutions, omissions, and the like are also included in the scope of the present disclosure and are similarly included in the invention described in the claims and the equivalent scopes thereof.

Furthermore, the procedure of the processing described in the present disclosure such as the above-described flowchart is an example, and it is not always necessary to perform the procedure. For example, a processing result of each processing may be sequentially stored in the storage unit of each device, and each component may acquire the processing result via the storage unit in the device.

Furthermore, the procedures of processing described in the present disclosure, such as the above-described flowcharts, may be regarded as a method having a series of these procedures. Alternatively, the procedures may be regarded as a program for causing a computer to execute the series of these procedures or a recording medium storing the program. The type of the recording medium does not affect the embodiment of the present disclosure, and thus is not particularly limited.

Note that in the present disclosure, the expression "and/or" means that it may be read as "and" and may be read as "or".

Note that the present disclosure can also employ the following configurations.

[1]

A communication device including:
- an acquisition unit that acquires a position of a reference point provided in a region related to a first wireless system and a limit value of an interference quantity at the reference point;
- a calculation unit that calculates, on the basis of at least the position and the limit value, allowable power by which an interference quantity of a radio wave transmitted by beamforming at the reference point is equal to or less than the limit value; and
- a radio wave communication unit that transmits a radio wave having a frequency within a second frequency band partially or entirely overlapping with a first frequency band allocated to the first wireless system by beamforming with power equal to or less than the allowable power.

[2]

The communication device according to [1] above, in which
- the calculation unit calculates the allowable power for each of a plurality of beam patterns related to the beamforming, and
- when any one of the plurality of beam patterns is selected, the radio wave communication unit transmits the radio wave according to a selected beam pattern with power equal to or less than allowable power corresponding to the selected beam pattern.

[3]

The communication device according to [2] above, further including
- a determination unit that determines whether to perform switching of the selected beam pattern,
- in which when it is determined to perform the switching, the radio wave communication unit transmits the radio wave according to a beam pattern to be newly switched with power equal to or less than allowable power corresponding to the beam pattern to be newly switched and calculated before determination of the switching.

[4]

The communication device according to [3] above, in which
- the determination unit determines whether to perform the switching on the basis of a radio wave or communication from a terminal that receives the radio wave.

[5]

The communication device according to any one of [1] to [4] above, in which
- the calculation unit calculates, when a plurality of the reference points is provided in the region, the allowable power for each of the plurality of the reference points, and
- the radio wave communication unit transmits the radio wave by beamforming with power equal to or less than a minimum value of allowable power of each of the plurality of the reference points.

[6]

The communication device according to any one of [1] to [5] above, in which
- the calculation unit selects a reference point that satisfies a predetermined condition when a plurality of the reference points is provided in the region, and calculates the allowable power for each of selected reference points, and
- the radio wave communication unit transmits the radio wave by beamforming with power equal to or less than a minimum value of the allowable power for each of the selected reference points.

[7]

The communication device according to any one of [2] to [4] above, in which
- the calculation unit calculates the allowable power for a beam pattern that satisfies a predetermined condition among the plurality of beam patterns, and
- the radio wave communication unit transmits the radio wave according to any one of beam patterns for which the allowable power is calculated.

[8]
The communication device according to any one of [2] to [4] above, in which
the calculation unit calculates the allowable power for a beam pattern that does not satisfy a predetermined condition among the plurality of beam patterns on the basis of allowable power of a beam pattern that satisfies the predetermined condition.

[9]
The communication device according to any one of [2] to [4] above, in which
the calculation unit
determines a transmittable beam pattern from the plurality of beam patterns on the basis of a radiation angle of a main lobe of each of the plurality of beam patterns and a direction toward the reference point, and
calculates the allowable power for a transmittable beam pattern.

[10]
The communication device according to [9] above, in which
the calculation unit calculates the allowable power for a beam pattern in which a direction toward the reference point exists within a predetermined range centered on a radiation angle of the main lobe.

[11]
A communication control device including:
a determination unit that determines whether a communication device that has requested permission to transmit a radio wave having a frequency within a shared frequency band used by a first wireless system interferes with the first wireless system; and
a transmission unit that transmits, in a case where the communication device and the first wireless system are determined to interfere with each other, a position of a reference point provided in a region related to the first wireless system and a limit value of an interference quantity at the reference point to the communication device.

[12]
The communication control device according to [11] above, in which
when it is determined that a plurality of communication devices interferes with the first wireless system, the determination unit distributes a limit value of an interference quantity at the reference point to the plurality of communication devices, and
the transmission unit transmits the distributed limit value to each of the plurality of communication devices.

[13]
A communication method including:
a step of acquiring a position of a reference point provided in a region related to a first wireless system and a limit value of an interference quantity at the reference point;
a step of calculating, on the basis of at least the position and the limit value, allowable power by which an interference quantity of a radio wave transmitted by beamforming at the reference point is equal to or less than the limit value; and
a step of transmitting a radio wave having a frequency within a second frequency band partially or entirely overlapping with a first frequency band allocated to the first wireless system by beamforming with power equal to or less than the allowable power.

REFERENCE SIGNS LIST

100 Communication network
110 (110A, 110B, 110C) Communication device
111 Transmission unit of communication device
112 Acquisition unit of communication device
113 Calculation unit
114 Radio wave communication unit
115 Antenna
116 Storage unit of communication device
117 Switching determination unit
120 Terminal
130 (130A, 130B) Communication control device
131 Acquisition unit of communication control device
132 Interference determination unit
133 Transmission unit of communication control device
134 Storage unit of communication control device
201, 202, 203 Protection zone
211, 212, 213 Reference point
301, 302 (302A, 302B) Beam pattern

The invention claimed is:

1. A communication device comprising:
circuitry configured to implement
an acquisition unit that acquires a position of a reference point provided in a region related to a first wireless system and a limit value of an interference quantity at the reference point;
a calculation unit that calculates, on a basis of at least the position and the limit value, allowable power by which an interference quantity of a radio wave transmitted by beamforming at the reference point is equal to or less than the limit value; and
a radio wave communication unit that transmits a radio wave having a frequency within a second frequency band partially or entirely overlapping with a first frequency band allocated to the first wireless system by beamforming with power equal to or less than the allowable power, wherein
the calculation unit calculates, when a plurality of the reference points is provided in the region, the allowable power for each of the plurality of the reference points, and
the radio wave communication unit transmits the radio wave by beamforming with power equal to or less than a minimum value of allowable power of each of the plurality of the reference points.

2. The communication device according to claim 1, wherein
the calculation unit calculates the allowable power for each of a plurality of beam patterns related to the beamforming, and
when any one of the plurality of beam patterns is selected, the radio wave communication unit transmits the radio wave according to a selected beam pattern with power equal to or less than allowable power corresponding to the selected beam pattern.

3. The communication device according to claim 2, further comprising
a determination unit that determines whether to perform switching of the selected beam pattern,
wherein when it is determined to perform the switching, the radio wave communication unit transmits the radio wave according to a beam pattern to be newly switched with power equal to or less than allowable power corresponding to the beam pattern to be newly switched and calculated before determination of the switching.

4. The communication device according to claim 3, wherein
the determination unit determines whether to perform the switching on a basis of a radio wave or communication from a terminal that receives the radio wave.

5. The communication device according to claim 2, wherein
    the calculation unit calculates the allowable power for a beam pattern that satisfies a predetermined condition among the plurality of beam patterns, and
    the radio wave communication unit transmits the radio wave according to any one of beam patterns for which the allowable power is calculated.

6. The communication device according to claim 2, wherein
    the calculation unit calculates the allowable power for a beam pattern that does not satisfy a predetermined condition among the plurality of beam patterns on a basis of allowable power of a beam pattern that satisfies the predetermined condition.

7. The communication device according to claim 2, wherein
    the calculation unit
    determines a transmittable beam pattern from the plurality of beam patterns on a basis of a radiation angle of a main lobe of each of the plurality of beam patterns and a direction toward the reference point, and
    calculates the allowable power for a transmittable beam pattern.

8. The communication device according to claim 1, wherein
    the calculation unit selects a reference point that satisfies a predetermined condition when a plurality of the reference points is provided in the region, and calculates the allowable power for each of selected reference points, and
    the radio wave communication unit transmits the radio wave by beamforming with power equal to or less than a minimum value of the allowable power for each of the selected reference points.

9. The communication device according to claim 7, wherein
    the calculation unit calculates the allowable power for a beam pattern in which a direction toward the reference point exists within a predetermined range including a radiation angle of the main lobe.

10. A communication method comprising:
    acquiring a position of a reference point provided in a region related to a first wireless system and a limit value of an interference quantity at the reference point;
    calculating, on a basis of at least the position and the limit value, allowable power by which an interference quantity of a radio wave transmitted by beamforming at the reference point is equal to or less than the limit value; and
    transmitting a radio wave having a frequency within a second frequency band partially or entirely overlapping with a first frequency band allocated to the first wireless system by beamforming with power equal to or less than the allowable power, wherein
    the calculating includes calculating, under a condition a plurality of the reference points is provided in the region, the allowable power for each of the plurality of the reference points, and
    the transmitting includes transmitting the radio wave by beamforming with power equal to or less than a minimum value of allowable power of each of the plurality of the reference points.

\* \* \* \* \*